US012379449B2

(12) United States Patent
Duan et al.

(10) Patent No.: US 12,379,449 B2
(45) Date of Patent: Aug. 5, 2025

(54) RECONFIGURABLE INTELLIGENT SURFACE (RIS)-ASSISTED TIMING ERROR CALIBRATION FOR MOBILE DEVICE POSITIONING

(71) Applicant: QUALCOMM Incorporated, San Diego, CA (US)

(72) Inventors: Weimin Duan, San Diego, CA (US); Alexandros Manolakos, Escondido, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 18/256,203

(22) PCT Filed: Jan. 28, 2022

(86) PCT No.: PCT/US2022/070423
§ 371 (c)(1),
(2) Date: Jun. 6, 2023

(87) PCT Pub. No.: WO2022/187773
PCT Pub. Date: Sep. 9, 2022

(65) Prior Publication Data
US 2024/0019524 A1     Jan. 18, 2024

(30) Foreign Application Priority Data

Mar. 2, 2021     (GR) ............................... 20210100122

(51) Int. Cl.
*G01S 5/02*     (2010.01)
*G01S 5/06*     (2006.01)
(Continued)

(52) U.S. Cl.
CPC ............ *G01S 5/021* (2013.01); *G01S 5/0273* (2013.01); *G01S 5/06* (2013.01); *G01S 5/10* (2013.01);
(Continued)

(58) Field of Classification Search
CPC .......... G01S 5/201; G01S 5/0273; G01S 5/06; G01S 5/10; G01S 7/006; G01S 7/40; G01S 13/876; H04W 64/00
(Continued)

(56) References Cited

U.S. PATENT DOCUMENTS

2017/0082729  A1*   3/2017   Bar-Shalom .............. G01S 5/12

FOREIGN PATENT DOCUMENTS

| CN | 111245494 A | 6/2020 |
| CN | 111983560 A | 11/2020 |

OTHER PUBLICATIONS

International Search Report and Written Opinion—PCT/US2022/070423—ISA/EPO—Apr. 25, 2022.

* cited by examiner

*Primary Examiner* — Bo Fan
(74) *Attorney, Agent, or Firm* — Weaver Austin Villeneuve & Sampson LLP/QUALCOMM

(57) ABSTRACT

Techniques for reconfigurable intelligent surface (RIS)-assisted calibration for timing errors in wireless nodes may comprise obtaining a set of wireless reference signal measurements comprising: first, second, third, and fourth measurements of reference signals traveling between the mobile device, a first wireless node, and a second wireless node, wherein a portion of the reference signals are reflected by the RIS while traveling between the mobile device and the first or second wireless node. A differential value comprising a difference between the third measurement and the fourth (Continued)

measurement is also obtained. Determining a position estimate of the mobile device may then be performed, based at least in part on the set of wireless reference signal measurements, the differential value, and a respective location of each of the first wireless node, the second wireless node, and the RIS.

30 Claims, 12 Drawing Sheets

(51) Int. Cl.
    *G01S 5/10*     (2006.01)
    *G01S 7/00*     (2006.01)
    *G01S 7/40*     (2006.01)
    *G01S 13/87*     (2006.01)
    *H04W 64/00*     (2009.01)

(52) U.S. Cl.
    CPC .............. *G01S 7/006* (2013.01); *G01S 7/40* (2013.01); *G01S 13/876* (2013.01); *H04W 64/00* (2013.01)

(58) Field of Classification Search
    USPC ........................................ 342/125, 127, 190
    See application file for complete search history.

RECONFIGURABLE INTELLIGENT SURFACE (RIS)-ASSISTED TIMING ERROR CALIBRATION FOR MOBILE DEVICE POSITIONING

RELATED APPLICATIONS

This application is a National Phase entry of International Application No. PCT/US22/70423, filed Jan. 28, 2022, entitled "RECONFIGURABLE INTELLIGENT SURFACE (RIS)-ASSISTED TIMING ERROR CALIBRATION FOR MOBILE DEVICE POSITIONING" which claims the benefit of Greek application No. 20210100122, filed Mar. 2, 2021, entitled "RECONFIGURABLE INTELLIGENT SURFACE (RIS)-ASSISTED TIMING ERROR CALIBRATION FOR MOBILE DEVICE POSITIONING", both of which are assigned to the assignee hereof, and incorporated herein in their entirety by reference.

BACKGROUND

1. Field of Invention

The present invention relates generally to the field of wireless communications, and more specifically to determining the location or position of an mobile device with radio frequency (RF) signals.

2. Description of Related Art

In a wireless communication network, the position of a mobile device may be determined by using the mobile device to measure RF signals transmitted by transmitting devices of the wireless communication network. New techniques are being developed for utilizing a Reconfigurable Intelligent Surface (RIS) in this type of position determination, where the mobile device measures RF signals transmitted by one or more transmitting devices and reflected from one or more RISs. The use of RISs in this manner have been limited, however. While base stations and other wireless nodes may be used to take reference measurements to determine and/or compensate for certain timing errors at the network or mobile device, RISs have not traditionally been used for this type of error calibration.

BRIEF SUMMARY

An example method of reconfigurable intelligent surface (RIS)-assisted calibration for timing errors in wireless nodes used in position determination of a mobile device, according to this disclosure, comprises obtaining a set of wireless reference signal measurements comprising: a first measurement of one or more wireless reference signals traveling between the mobile device and a first wireless node, a second measurement of one or more wireless reference signals traveling between the mobile device and a second wireless node, a third measurement of one or more wireless reference signals reflected by a RIS while traveling between the mobile device and the first wireless node, and a fourth measurement of one or more wireless reference signals reflected by the RIS while traveling between the mobile device and the second wireless node. The method also comprises obtaining a differential value comprising a difference between the third measurement and the fourth measurement. The method also comprises determining a position estimate of the mobile device based at least in part on: the set of wireless reference signal measurements, the differential value, and a respective location of each of the first wireless node, the second wireless node, and the RIS.

An example device for reconfigurable intelligent surface (RIS)-assisted calibration for timing errors in wireless nodes used in position determination of a mobile device, according to this disclosure, comprises a transceiver, a memory, and one or more processing units communicatively coupled with the transceiver and the memory. The one or more processing units are configured to obtain, via the transceiver, a set of wireless reference signal measurements comprising: a first measurement of one or more wireless reference signals traveling between the mobile device and a first wireless node; a second measurement of one or more wireless reference signals traveling between the mobile device and a second wireless node; a third measurement of one or more wireless reference signals reflected by a RIS while traveling between the mobile device and the first wireless node; and a fourth measurement of one or more wireless reference signals reflected by the RIS while traveling between the mobile device and the second wireless node. The one or more processing units are also configured to obtain a differential value comprising a difference between the third measurement and the fourth measurement. The one or more processing units are also configured to determine a position estimate of the mobile device based at least in part on: the set of wireless reference signal measurements, the differential value, and a respective location of each of the first wireless node, the second wireless node, and the RIS.

Another example device for reconfigurable intelligent surface (RIS)-assisted calibration for timing errors in wireless nodes used in position determination of a mobile device, according to this disclosure, comprises a means for obtaining a set of wireless reference signal measurements comprising: a first measurement of one or more wireless reference signals traveling between the mobile device and a first wireless node, a second measurement of one or more wireless reference signals traveling between the mobile device and a second wireless node, a third measurement of one or more wireless reference signals reflected by a RIS while traveling between the mobile device and the first wireless node, and a fourth measurement of one or more wireless reference signals reflected by the RIS while traveling between the mobile device and the second wireless node. The device also comprises means for obtaining a differential value comprising a difference between the third measurement and the fourth measurement. The device also comprises means for determining a position estimate of the mobile device based at least in part on: the set of wireless reference signal measurements, the differential value, and a respective location of each of the first wireless node, the second wireless node, and the RIS.

An example non-transitory computer-readable medium, according to this disclosure, comprises stores instructions for reconfigurable intelligent surface (RIS)-assisted calibration for timing errors in wireless nodes used in position determination of a mobile device. The instructions comprise code for obtaining a set of wireless reference signal measurements comprising: a first measurement of one or more wireless reference signals traveling between the mobile device and a first wireless node, a second measurement of one or more wireless reference signals traveling between the mobile device and a second wireless node, a third measurement of one or more wireless reference signals reflected by a MS while traveling between the mobile device and the first wireless node, and a fourth measurement of one or more wireless reference signals reflected by the RIS while traveling between the mobile device and the second wireless node. The instructions also comprise code for obtaining a differential value comprising a difference between the third measurement and the fourth measurement. The instructions also comprise code for determining a position estimate of the mobile device based at least in part on: the set of wireless reference signal measurements, the differential value, and a respective location of each of the first wireless node, the second wireless node, and the RIS.

Figure 1:
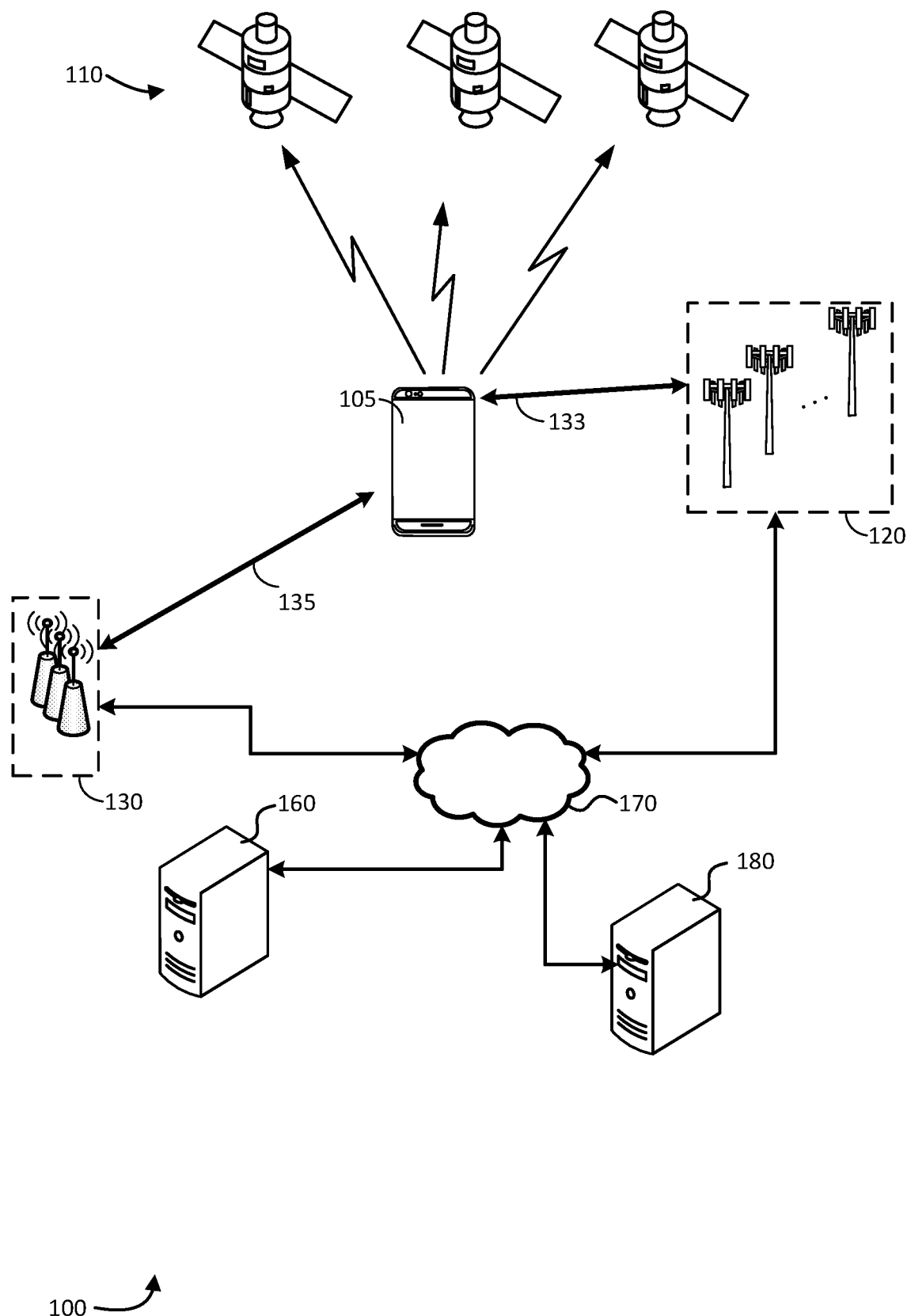
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. A "wireless reference signal" may comprise a particular type of RF signal that may be used as a reference (e.g., timing reference) for positioning of a mobile device. As such, wireless reference signals may include particular sequences, encoding, and/or other features that can enhance optimization/performance of the wireless reference signal as a reference.

FIG. 1 is a simplified illustration of a positioning system 100 in which a user equipment (UE) 105, location server 160, and/or other components of the positioning system 100 can use the techniques provided herein for making a reconfigurable intelligent surface (RIS)-assisted timing error calibration, according to an embodiment. It can be noted, however, that techniques described herein are not necessarily limited to a positioning system 100. The techniques described herein may be implemented by one or more components of the positioning system 100. The positioning system 100 can include a UE 105, one or more satellites 110 (also referred to as space vehicles (SVs)) for a Global Navigation Satellite System (GNSS) such as the Global Positioning System (GPS), base stations 120, access points (APs) 130, location server 160, network 170, and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." Physical transmission points may comprise an array of antennas (e.g., as in a Multiple Input-Multiple Output (MIMO) system and/or where the base station employs beamforming) of the base station. The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE 105 and a neighbor base station whose reference RF signals the UE 105 is measuring.

As used herein, the term "cell" may generically refer to a logical communication entity used for communication with a base station 120 and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate the location determination. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LNIF) that supports location of UE 105 using a control plane (CP) location solution for NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. Moreover, in some embodiments, location of the UE 105 estimated at least in part based on measurements of RF signals communicated between the UE 105 and one or more other UEs (not shown in FIG. 1), which may be mobile. Direct communication between UEs in this manner may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may also be specified as a geodetic location (as a latitude and longitude) or as a civic location (e.g. in terms of a street address or using other location related names and labels). A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, asset tracking or child or pet location). Additionally or alternatively, the external client 180 may obtain and provide the location of UE 105 to an emergency services provider, government agency, etc.

As previously noted, the example positioning system 100 can be implemented using a wireless communication network, such as an LTE-based or 5G NR-based network. 5G NR is a wireless RF interface undergoing standardization by the 3rd Generation Partnership Project (3GPP). 5G NR is poised to offer enhanced functionality over previous generation (LTE) technologies, such as significantly faster and more responsive mobile broadband, enhanced conductivity through Internet of Things (IoT) devices, and more. Additionally, 5G NR enables new positioning techniques for UEs, including Angle of Arrival (AoA)/Angle of Departure (AoD) positioning, UE-based positioning, and multi-cell Round Trip signal propagation Time (RTT) positioning. With regard to RTT positioning, this involves taking RTT measurements between the UE and multiple base stations.

Figure 2:
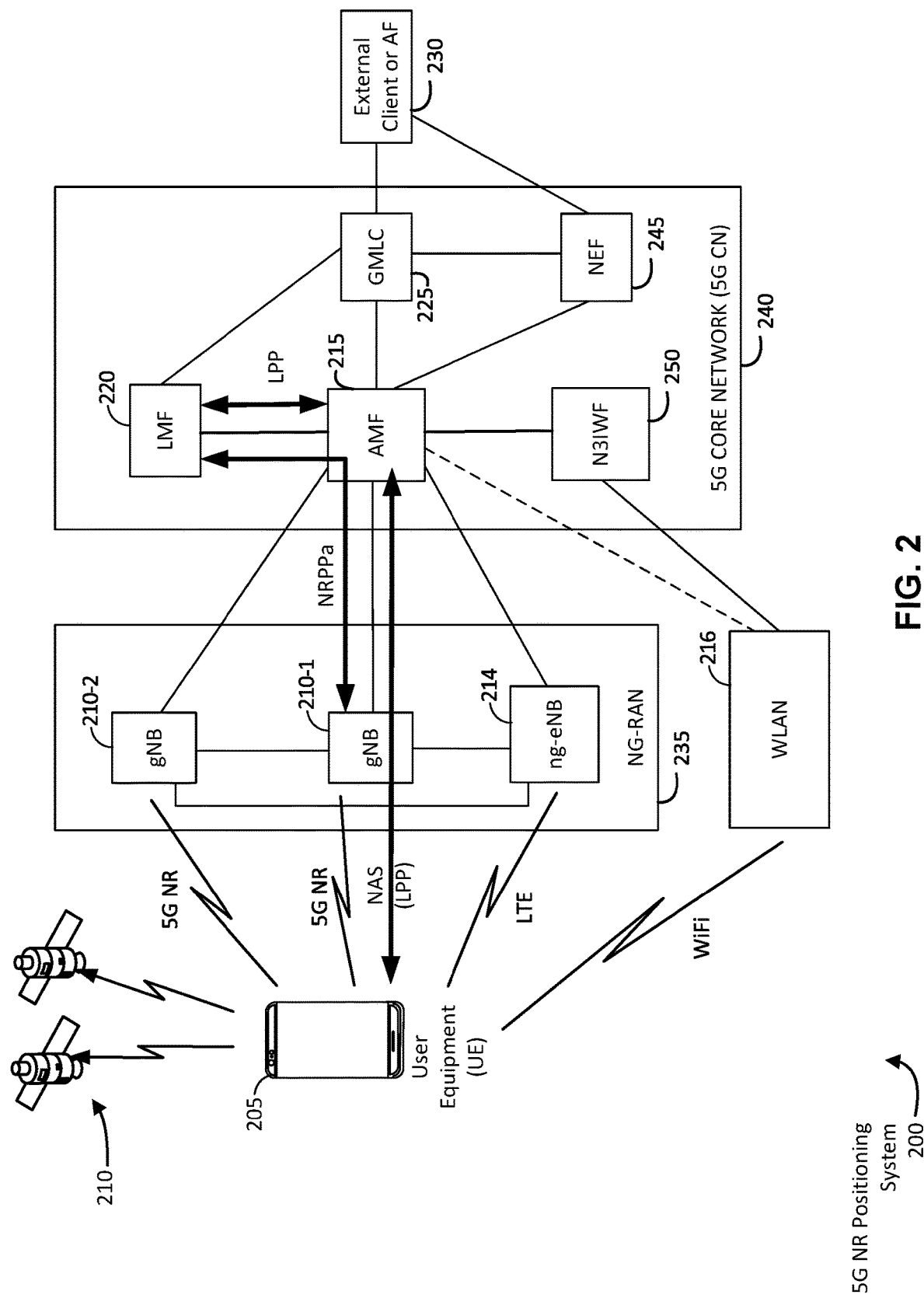
FIG. 2 is a diagram of a 5th Generation (5G) New Radio (NR) positioning system, illustrating an embodiment of a positioning system (e.g., the positioning system of FIG. 1) implemented within a 5G NR communication system.

FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 205 (which may correspond with UE 105 of FIG. 1) by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 205, and components 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. Standardization of an NG-RAN and 5G CN is ongoing in 3GPP. Accordingly, NG-RAN 235 and 5G CN 240 may conform to current or future standards for 5G support from 3GPP. The 5G NR positioning system 200 may further utilize information from GNSS satellites 110 from a GNSS system like Global Positioning System (GPS) or similar system. Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 205 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, WLANs 216, Access and Mobility Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 205 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 205 may correspond to a cellphone, smartphone, laptop, tablet, personal data assistant (PDA), tracking device, navigation device, Internet of Things (IoT) device, or some other portable or moveable device. Typically, though not necessarily, the UE 205 may support wireless communication using one or more Radio Access Technologies (RATs) such as using Global System for Mobile Communications (GSM), Code Division Multiple Access (CDMA), Wideband CDMA (WCDMA), Long-Term Evolution (LTE), High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 205 may also support wireless communication using a WLAN 216 which (like the one or more RATs, and as previously noted with respect to FIG. 1) may connect to other networks, such as the Internet. The use of one or more of these RATs may allow the UE 205 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 205 (e.g., via the GMLC 225).

The UE 205 may include a single entity or may include multiple entities, such as in a personal area network where a user may employ audio, video and/or data I/O devices, and/or body sensors and a separate wireline or wireless modem. An estimate of a location of the UE 205 may be referred to as a location, location estimate, location fix, fix, position, position estimate, or position fix, and may be geodetic, thus providing location coordinates for the UE 205 (e.g., latitude and longitude), which may or may not include an altitude component (e.g., height above sea level, height above or depth below ground level, floor level or basement level). Alternatively, a location of the UE 205 may be expressed as a civic location (e.g., as a postal address or the designation of some point or small area in a building such as a particular room or floor). A location of the UE 205 may also be expressed as an area or volume (defined either geodetically or in civic form) within which the UE 205 is expected to be located with some probability or confidence level (e.g., 67%, 95%, etc.). A location of the UE 205 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210) and/or an antenna of a gNB. Pairs of gNBs 210 in NG-RAN 235 may be connected to one another (e.g., directly as shown in FIG. 2 or indirectly via other gNBs 210). Access to the 5G network is provided to UE 205 via wireless communication between the UE 205 and one or more of the gNBs 210, which may provide wireless communications access to the 5G CN 240 on behalf of the UE 205 using 5G NR. 5G NR radio access may also be referred to as NR radio access or as 5G radio access. In FIG. 2, the serving gNB for UE 205 is assumed to be gNB 210-1, although other gNBs (e.g. gNB 210-2) may act as a serving gNB if UE 205 moves to another location or may act as a secondary gNB to provide additional throughput and bandwidth to UE 205.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 205. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 205 but may not receive signals from UE 205 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate indirectly via another component of the 5G NR positioning system 200, such as the LMF 220.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 205 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 205 to other elements in 5G CN 240 and/or may support interworking of one or more protocols used by WLAN 216 and UE 205 to one or more protocols used by other elements of 5G CN 240 such as AMF 215. For example, N3IWF 250 may support IPSec tunnel establishment with UE 205, termination of IKEv2/IPSec protocols with UE 205, termination of N2 and N3 interfaces to 5G CN 240 for control plane and user plane, respectively, relaying of uplink and downlink control plane Non-Access Stratum (NAS) signaling between UE 205 and AMF 215 across an N1 interface. In some other embodiments, WLAN 216 may connect directly to elements in 5G CN 240 (e.g. AMF 215 as shown by the dashed line in FIG. 2) and not via N3IWF 250—e.g. if WLAN 216 is a trusted WLAN for 5G CN 240. It is noted that while only one WLAN 216 is shown in FIG. 2, some embodiments may include multiple WLANs 216.

Access nodes may comprise any of a variety of network entities enabling communication between the UE 205 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information for multiple RATs from the LMF 220, take measurements for one of the multiple RATs (e.g., measurements of the UE 205) and/or obtain measurements from the UE 205 that are transferred to the access node using one or more of the multiple RATs. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a WCDMA protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 205, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5G CN 240 in FIG. 2. The methods and techniques described herein for UE 205 positioning using common or generic positioning procedures may be applicable to such other networks.

The gNBs 210 and ng-eNB 214 can communicate with an AMF 215, which, for positioning functionality, communicates with an LMF 220. The AMF 215 may support mobility of the UE 205, including cell change and handover of UE 205 from an access node 210, 214, or 216 of a first RAT to an access node 210, 214, or 216 of a second RAT. The AMF 215 may also participate in supporting a signaling connection to the UE 205 and possibly data and voice bearers for the UE 205. The LMF 220 may support positioning of the UE 205 when UE 205 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematics (RTK), Precise Point Positioning (PPP), Differential GNSS (DGNSS), ECID, angle of arrival (AoA), angle of departure (AoD), WLAN positioning, and/or other positioning procedures and methods. The LMF 220 may also process location services requests for the UE 205, e.g., received from the AMF 215 or from the GMLC 225. The LMF 220 may be connected to AMF 215 and/or to GMLC 225. The LMF 220 may be referred to by other names such as a Location Manager (LM), Location Function (LF), commercial LMF (CLMF), or value added LMF (VLMF). In some embodiments, a node/system that implements the LMF 220 may additionally or alternatively implement other types of location-support modules, such as an Evolved Serving Mobile Location Center (E-SMLC) or Service Location Protocol (SLP). It is noted that in some embodiments, at least part of the positioning functionality (including determination of a UE's location) may be performed at the UE 205 (e.g., by processing downlink PRS (DL-PRS) signals transmitted by wireless nodes such as gNBs 210, ng-eNB 214 and/or WLAN 216, and/or using assistance data provided to the UE 205, e.g., by LMF 220).

The Gateway Mobile Location Center (GMLC) 225 may support a location request for the UE 205 received from an external client 230 and may forward such a location request to the AMF 215 for forwarding by the AMF 215 to the LMF 220 or may forward the location request directly to the LMF 220. A location response from the LMF 220 (e.g., containing a location estimate for the UE 205) may be similarly returned to the GMLC 225 either directly or via the AMF 215, and the GMLC 225 may then return the location response (e.g., containing the location estimate) to the external client 230. The GMLC 225 is shown connected to both the AMF 215 and LMF 220 in FIG. 2 though only one of these connections may be supported by 5G CN 240 in some implementations.

As further illustrated in FIG. 2, the LMF 220 may communicate with the gNBs 210 and/or with the ng-eNB 214 using the LPPa protocol (which also may be referred to as NRPPa or NPPa). LPPa protocol in NR may be the same as, similar to, or an extension of the LPPa protocol in LTE (related to LTE Positioning Protocol (LPP)), with LPPa messages being transferred between a gNB 210 and the LMF 220, and/or between an ng-eNB 214 and the LMF 220, via the AMF 215. As further illustrated in FIG. 2, LMF 220 and UE 205 may communicate using the LPP protocol. LMF 220 and UE 205 may also or instead communicate using an LPP protocol (which, in NR, also may be referred to as NRPP or NPP). Here, LPP messages may be transferred between the UE 205 and the LMF 220 via the AMF 215 and a serving gNB 210-1 or serving ng-eNB 214 for UE 205. For example, LPP and/or LPP messages may be transferred between the LMF 220 and the AMF 215 using messages for service-based operations (e.g., based on the Hypertext Transfer Protocol (HTTP)) and may be transferred between the AMF 215 and the UE 205 using a 5G NAS protocol. The LPP and/or LPP protocol may be used to support positioning of UE 205 using UE assisted and/or UE based position methods such as A-GNSS, RTK, TDOA and/or Enhanced Cell ID (ECID). The LPPa protocol may be used to support positioning of UE 205 using network based position methods such as ECID (e.g., when used with measurements obtained by a gNB 210 or ng-eNB 214) and/or may be used by LMF 220 to obtain location related information from gNBs 210 and/or ng-eNB 214, such as parameters defining DL-PRS transmission from gNBs 210 and/or ng-eNB 214.

In the case of UE 205 access to WLAN 216, LMF 220 may use LPPa and/or LPP to obtain a location of UE 205 in a similar manner to that just described for UE 205 access to a gNB 210 or ng-eNB 214. Thus, LPPa messages may be transferred between a WLAN 216 and the LMF 220, via the AMF 215 and N3IWF 250 to support network-based positioning of UE 205 and/or transfer of other location information from WLAN 216 to LMF 220. Alternatively, LPPa messages may be transferred between N3IWF 250 and the LMF 220, via the AMF 215, to support network-based positioning of UE 205 based on location related information and/or location measurements known to or accessible to N3IWF 250 and transferred from N3IWF 250 to LMF 220 using LPPa. Similarly, LPP and/or LPP messages may be transferred between the UE 205 and the LMF 220 via the AMF 215, N3IWF 250, and serving WLAN 216 for UE 205 to support UE assisted or UE based positioning of UE 205 by LMF 220.

In a 5G NR positioning system 200, positioning methods can be categorized as being "UE assisted" or "UE based." This may depend on where the request for determining the position of the UE 205 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 205 may obtain location measurements and send the measurements to a location server (e.g., LMF 220) for computation of a location estimate for UE 205. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AOA, Receive Time-Transmission Time Difference (Rx-Tx), Differential AOA (DAOA), AOD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 205 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 205 may obtain location measurements (e.g., which may be the same as or similar to location measurements for a UE assisted position method) and may further compute a location of UE 205 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 205, and/or may receive measurements obtained by UE 205 or by an AP in WLAN 216 in the case of N3IWF 250, and may send the measurements to a location server (e.g., LMF 220) for computation of a location estimate for UE 205.

Positioning of the UE 205 also may be categorized as uplink (UL), downlink (DL), or downlink-uplink (DL-UL) based, depending on the types of signals used for positioning. If, for example, positioning is based solely on signals received at the UE 205 (e.g., from a base station or other UE), the positioning may be categorized as DL based. On the other hand, if positioning is based solely on signals transmitted by the UE 205 (which may be received by a base station or other UE, for example), the positioning may be categorized as UL based. Positioning that is DL-UL based includes positioning, such as RTT-based positioning, that is based on signals that are both transmitted and received by the UE 205. Sidelink (SL)-assisted positioning comprises signals communicated between the UE 205 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AOD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AOD and/or AOA.

Figure 3:
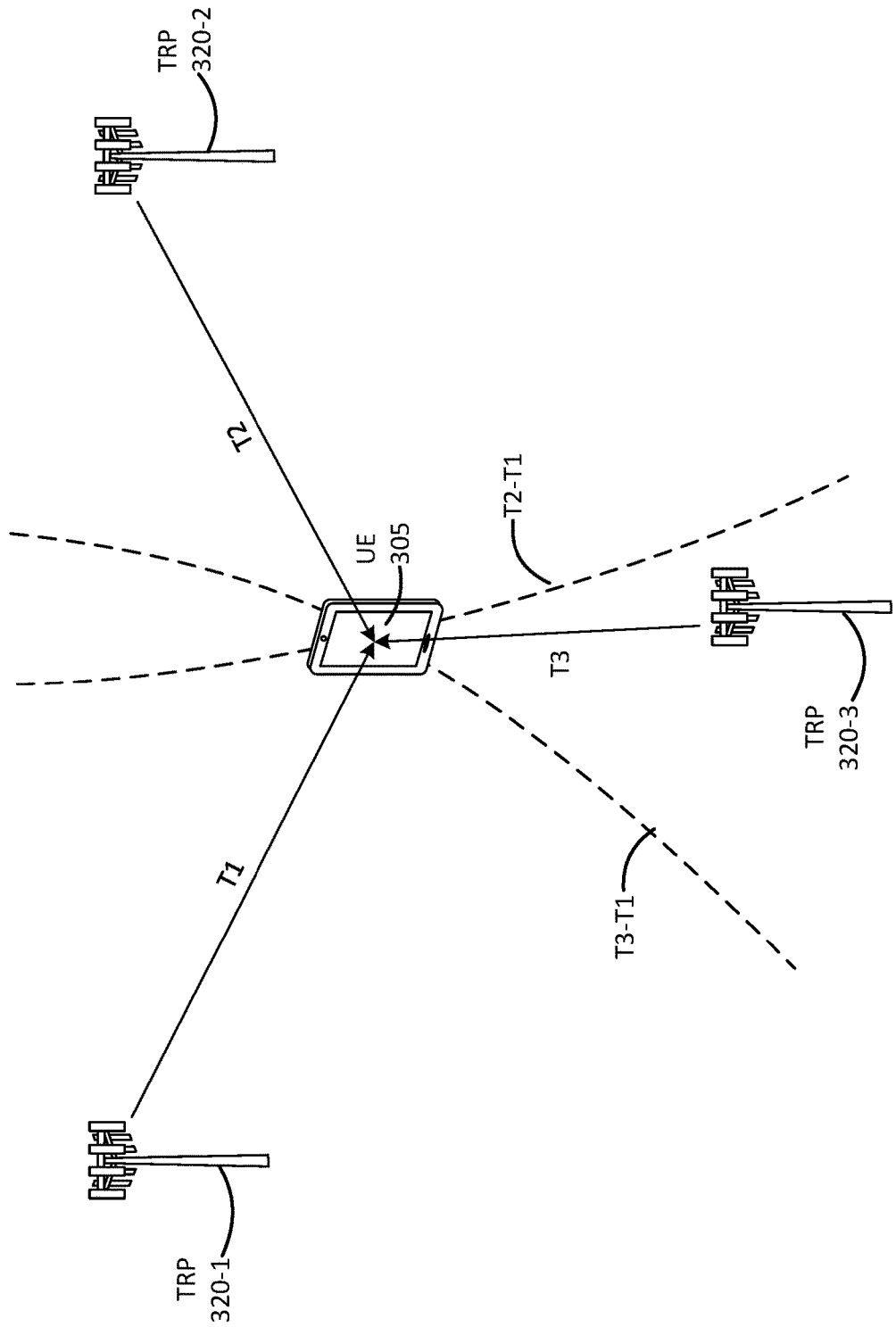
FIG. 3 is a simplified diagram of a configuration of a positioning system, illustrating how Time Difference Of Arrival (TDOA)-based positioning of a user equipment (UE) may be performed, according to some embodiments.

FIG. 3 is an illustration of how TDOA-based positioning can be performed, according to some embodiments. TDOA-based positioning uses wireless signaling between TRPs 310-1, 310-2, and 310-3 (collectively and generically referred to herein as TRPs 310) and the UE 305 to determine the location of the UE 305. Here, TRPs 320 may correspond to base stations 120, gNBs 210, and/or ng-eNB 214 as previously described and illustrated in FIGS. 1 and 2. In brief, TDOA-based positioning uses known locations of the TRPs 320 and time differences between signals sent to or received from the UE 305 to determine the location of the UE 305. In particular, downlink PRS (DL-PRS) uses time differences of signals sent from the TRPs 320 to the UE 305, and uplink PRS (UL-PRS) uses time differences of signals sent from the UE 305 to the TRPs 320.

In TDOA-based positioning, a location server may provide TDOA assistance data to a UE 305 for a reference TRP (which may be called a "reference cell" or "reference resource"), and one or more neighboring TRPs (which may be called "neighbor cells" or "neighboring cells", and which individually may be called a "target cell" or "target resource") relative to the reference TRP. For example, the assistance data may provide the center channel frequency of each TRP, various PRS configuration parameters (e.g., PRS length, periodicity, muting sequence, frequency hopping sequence, PRS ID, PRS bandwidth), a TRP (cell) global ID, PRS signal characteristics associated with a directional PRS, and/or other TRP related parameters applicable to TDOA or some other position method. TDOA-based positioning by a UE 305 may be facilitated by indicating the serving TRP for the UE 305 in the TDOA assistance data (e.g., with the reference TRP indicated as being the serving TRP). For DL-TDOA, TDOA assistance data may also include "expected Reference Signal Time Difference (RSTD)" parameters, which provide the UE 305 with information about the RSTD values the UE 305 is expected to measure at its current location between the reference TRP and each neighbor TRP, together with an uncertainty of the expected RSTD parameter. The expected RSTD, together with the associated uncertainty, may define a search window for the UE 305 within which the UE 305 is expected to measure the RSTD value. DL-TDOA assistance information may also include PRS configuration information parameters, which allow a UE 305 to determine when a PRS positioning occasion occurs on signals received from various neighbor TRPs relative to PRS positioning occasions for the reference TRP, and to determine the PRS sequence transmitted from various TRPs in order to measure a time of arrival (TOA) or RSTD. TOA measurements may be RSRP (Reference Signal Receive Power) measurements of average power of Resource Elements (RE) that carry PRS (or other reference signals).

Using the RSTD measurements, the known absolute or relative transmission timing of each TRP, and the known position(s) of wireless node physical transmitting antennas for the reference and neighboring TRPs, the UE position may be calculated (e.g., by the UE 305 or by a location server). More particularly, the RSTD for a neighbor TRP "k" relative to a reference TRP "Ref," may be given as the difference in TOA measurements of signals from each TRP (i.e., $TOA_k - TOA_{Ref}$), where the TOA values may be measured modulo one subframe duration (1 ms) to remove the effects of measuring different subframes at different times. In FIG. 3, for example, a first TRP 310-1 may be designated as the reference TRP, and second and third TRPs (310-2 and 310-3) are neighbor TRPs. If UE 305 receives reference signals from first TRP 310-1, second TRP 310-2, and third TRP 310-3 at times T1, T2, and T2, respectively, then the RSTD measurement for second TRP 310-2 would be determined as T2-T1 and the RSTD measurement for third TRP 310-3 would be determined as T3-T1. RSTD measurements can be used by the UE 305 and/or sent to a location server to determine the location of the UE 305 using (i) the RSTD measurements, (ii) the known absolute or relative transmission timing of each TRP, (iii) the known position(s) of TRPs 310 for the reference and neighboring TRPs, and/or (iv) directional PRS characteristics such as a direction of transmission. Geometrically, information (i)-(iv) allows for possible locations of the UE 305 to be determined for each RSTD (where each RSTD results in a hyperbola, as shown in FIG. 3), and the position of the UE 305 to be determined from the intersection of the possible locations for all RSTDs.

UL-TDOA positioning uses a similar process to the DL-TDOA described above. However, rather than making RSTD measurements at the UE 305, the UE 305 can transmit one or more reference signals, which are measured by TRPs 320. Differences in times at which the TRPs receive the signals (accounting for any time differences between the transmission of different signals) can be used to determine the location of the UE 305. Assistance data provided to the UE 305 for UL-TDOA may comprise PRS configuration parameters (similar to those described above with regard to DL-TDOA) for transmitting the one or more reference signals.

Figure 4:
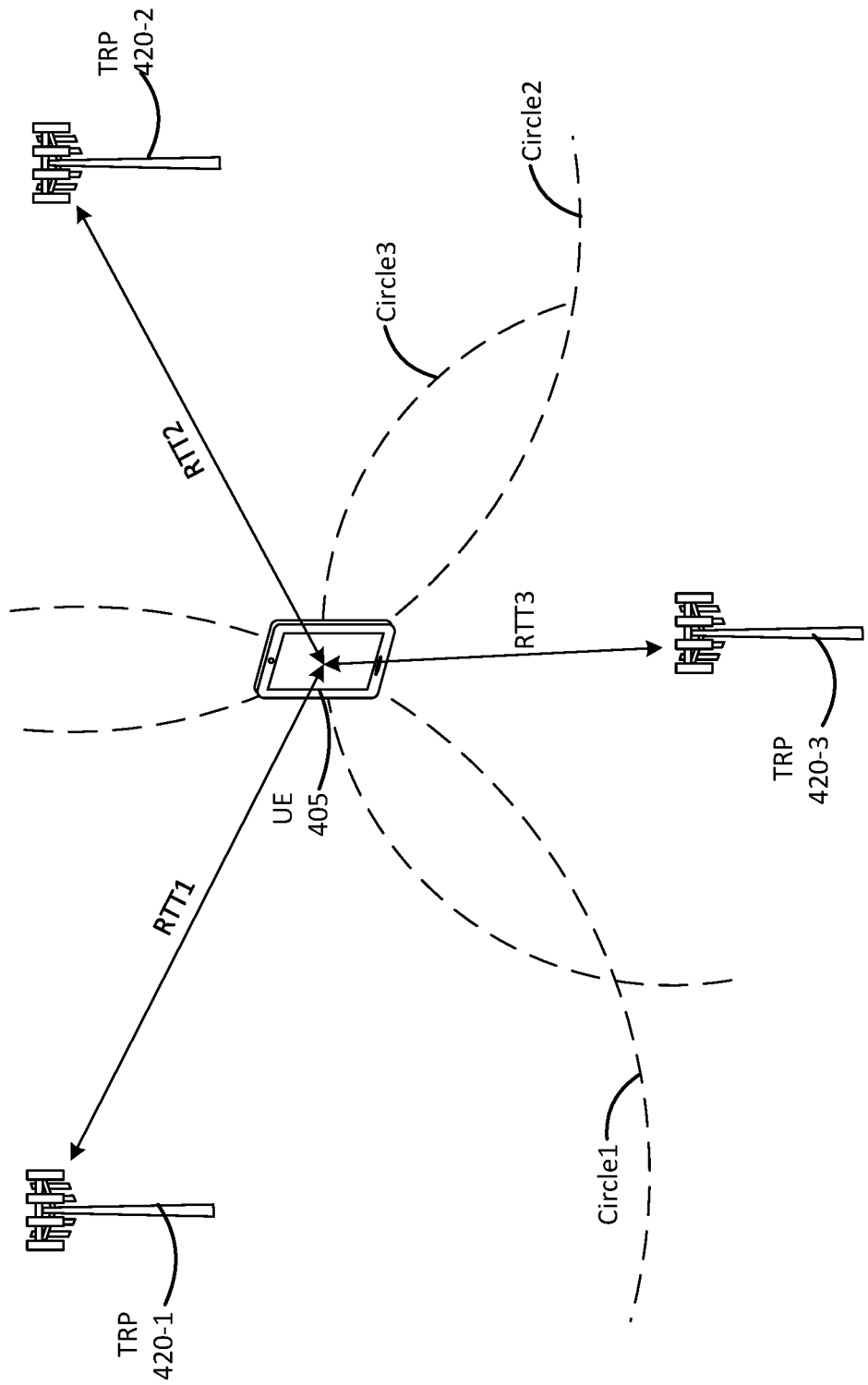
FIG. 4 is a simplified diagram of a configuration of a positioning system, illustrating how Round-Trip-Time (RTT)-based positioning of a UE may be performed, according to some embodiments.

FIG. 4 is an illustration of how RTT-based positioning (or multi-RTT) can be performed, according to some embodiments. In brief, RTT-based positioning includes positioning methods in which the position of the UE 405 is determined based on known positions of TRPs (e.g., TRPs 420) and/or other devices with known locations (e.g., other UEs), and determined distances between the UE 405 and the TRPs and/or other devices. RTT measurements between the UE 405 and each TRP/device are used to determine a distance between the UE 405 and the respective TRP, and multilateration can be used to determine the location of the UE 405. It can be noted that, in alternative embodiments, other devices with known locations (e.g., other UEs, other types of TRPs, etc.) can be used in addition or as an alternative to the TRPs 420 illustrated in FIG. 4.

In RTT-based positioning, a location server may coordinate RTT measurements between the UE 405 and each TRP. Information provided to the UE 405 may be included in RTT assistance data. This can include, for example, reference signal (e.g., PRS) timing and other signal characteristics, TRP (cell) ID, and/or other TRP related parameters applicable to multi-RTT or some other position method. Depending on desired functionality, RTT measurements may be performed (and initiated by) the UE 405 or a TRP 410.

RTT measurements measure distance using Over The Air (OTA) delay. An initiating device (e.g., the UE 405 or a TRP 410) transmits a first reference signal at first time, T1, which propagates to a responding device. At a second time, T2, the first reference signal arrives at the responding device. The OTA delay (i.e., the propagation time it takes for the first reference signal to travel from the initiating device to the responding device) is the difference between T1 and T2. The responding device then transmits a second reference signal at a third time, T3, and the second reference signal is received and measured by the initiating device at a fourth time, T4. RSRP measurements may be used to determine TOA for times T2 and T4. Distance, d, between the initiating and responding devices therefore can be determined using the following equation:

$$\frac{2d}{c} = (T_4 - T_1) - (T_3 - T_2) = (T_4 - T_1) + (T_2 - T_3). \quad (1)$$

(As will be appreciated, distance, d, divided by the speed of RF propagation, c, equals the OTA delay.) Thus, a precise determination of the distance between the initiating device and responding device can be performed.

RTT measurements between the UE 405 and TRPs 410 can therefore allow the position of the UE 405 to be determined using multilateration. That is, RTT measurements between the UE 405 and the first TRP 410-1, second TRP 210-2, and third TRP 410-3 (RTT measurements RTT1, RTT2, and RTT3, respectively) result in a determination of the distance of the UE 405 from each of the TRPs 410. These distances can be used to trace circles around known positions of the TRPs 410 (where Circle1 corresponds to TRP 410-1, Circle2 corresponds to TRP 410-2, and Circle3 corresponds to TRP 410-3.) The position of the UE 405 can be determined as the intersection between the circles.

Because TDOA, RTT, and other positioning methods are based on precise timing, errors in this timing can affect the accuracy of the estimated position of a UE using these methods. These errors can include network synchronization errors (e.g., synchronization between TRPs), transmission timing errors (Tx error) at the UE or TRPs, and reception timing errors (Rx error) at the UE or TRPs. These errors may impact different positioning methods in different ways. A summary of how different positioning methods are impacted by different timing errors is provided in Table 1.

TABLE 1

Sensitivity of Positioning Methods to Timing Errors

| Positioning Method | Network sync | Tx error TRP | Rx error TRP | Tx error UE | Rx error UE |
|---|---|---|---|---|---|
| DL-TDOA | Yes | Yes | N/A | N/A | No |
| UL-TDOA | Yes | N/A | Yes | No | N/A |
| RTT | No | Yes | Yes | Yes | Yes |
| Differential RTT | No | Yes | Yes | No | No |
| Double Differential RTT | No | No | No | No | No |

As can be seen in Table 1, network synchronization errors can impact TDOA-based positioning, and transmission timing errors and reception timing errors have different impacts on TDOA-based positioning, RTT-based positioning, and differential RTT-based positioning. Notably, double differential RTT-based positioning is not impacted by any of these timing errors.

Figure 5:
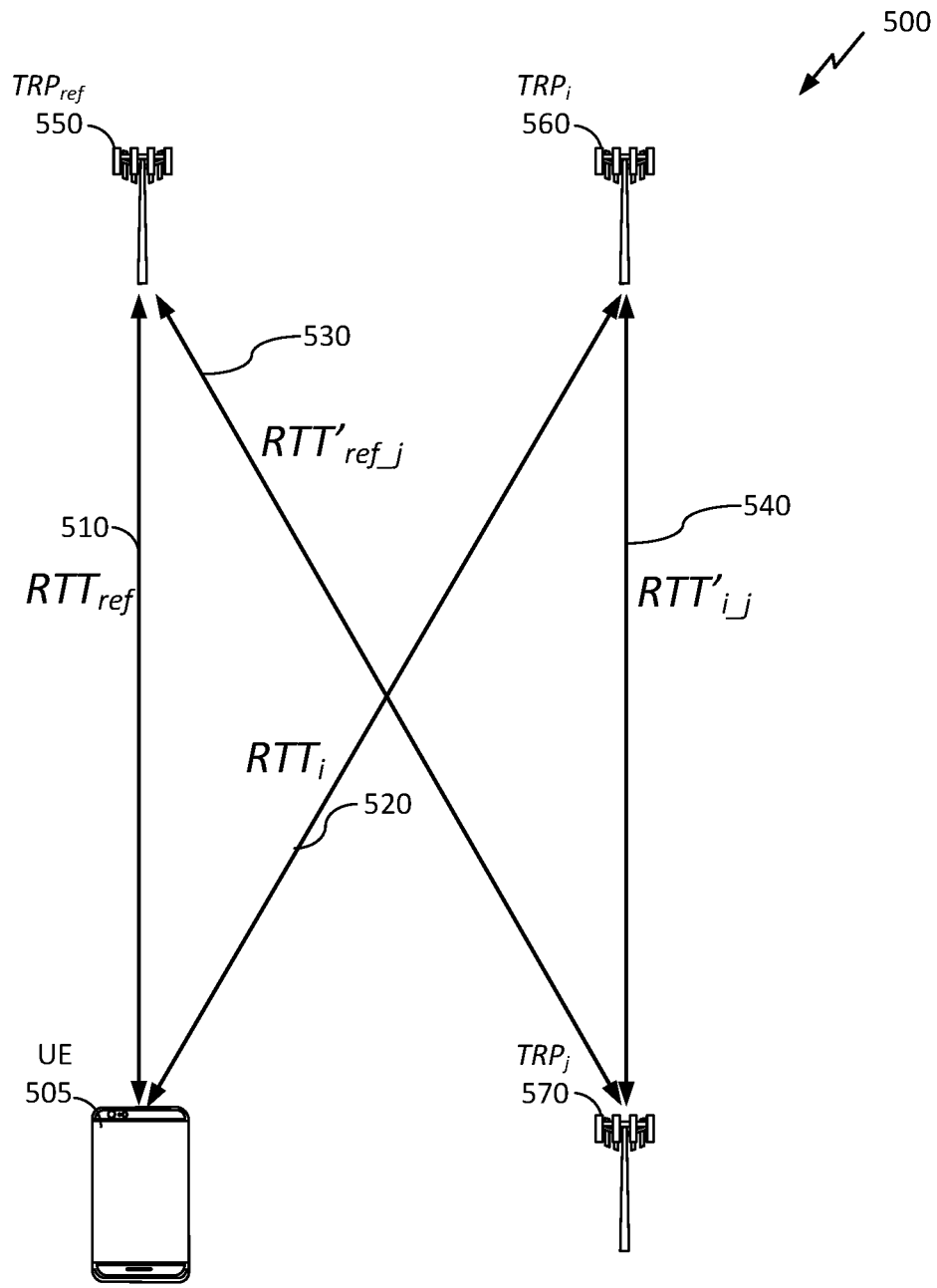
FIG. 5 is a simplified diagram of a configuration of a positioning system, illustrating how double differential RTT-based positioning may be performed using a Transmission Reception Point (TRP) as to take reference measurements.

The reasoning why the timing errors in Table 1 have no effect on double differential RTT has to do with the use of leveraging RTT measurements from a TRP with a known location. FIG. 5 in the following description help illustrate why.

FIG. 5 is a simplified diagram of a configuration 500 in which double differential RTT can be made. Here, the position of a UE 505 can be determined using RTT measurements between the various components illustrated, where RTT measurements are made using wireless signals that travel along the paths shown by arrows 510-540. Specifically, RTT measurement $RTT_{ref}$ 510 is made between the UE 505 and $TRP_{ref}$ 550, and RTT measurement $RTT_i$ 520 is made between the UE 505 and $TRP_i$ 560. Further, as noted, embodiments further leverage RTT measurements made by an additional TRP (TRPS 570) with a known location. Specifically, RTT measurements $RTT'ref_j$ 530 are made between TRPS 570 and $TRP_{ref}$ 550, and RTT measurement $RTT'ref_j$ 540 is made between the TRPS 570 and $TRP_i$ 560. Using information from these RTT measurements, transmission timing errors and reception timing errors caused by both the UE-side group delay and TRP-side group delay can be removed. More specifically, because the precise position of TRPS 570 relative to $TRP_i$ 560 and $TRP_{ref}$ 550 is known, the propagation times can be calculated and removed from measurements $RTT'ref_j$ 530 and $RTT'ref_j$ 540. This remaining timing errors in these measurements can then be calibrated for when determining the position of the UE 505.

It can be noted that other wireless nodes may be used other than the additional TRP (TRPS 570). Another UE with a known location, for example, can be used in double differential RTT-based position determination of the UE 505 in a similar manner. To perform double differential RTT in this manner, a wireless node may need to (1) transmit and receive reference signals to perform RTT measurements as shown in FIGS. 5, and (2) have processing capabilities to perform the RTT measurements.

These two requirements can result in restrictions in double differential RTT positioning of the UE 505. There may be circumstances in which an estimated position of the UE 505 is desired, for example, where an additional TRP or other wireless node is not available, where a position of another wireless node is not known, and/or where an additional TRP or other wireless node is unable to spare processing capabilities or other resources for performing double differential RTT positioning.

Figure 6:
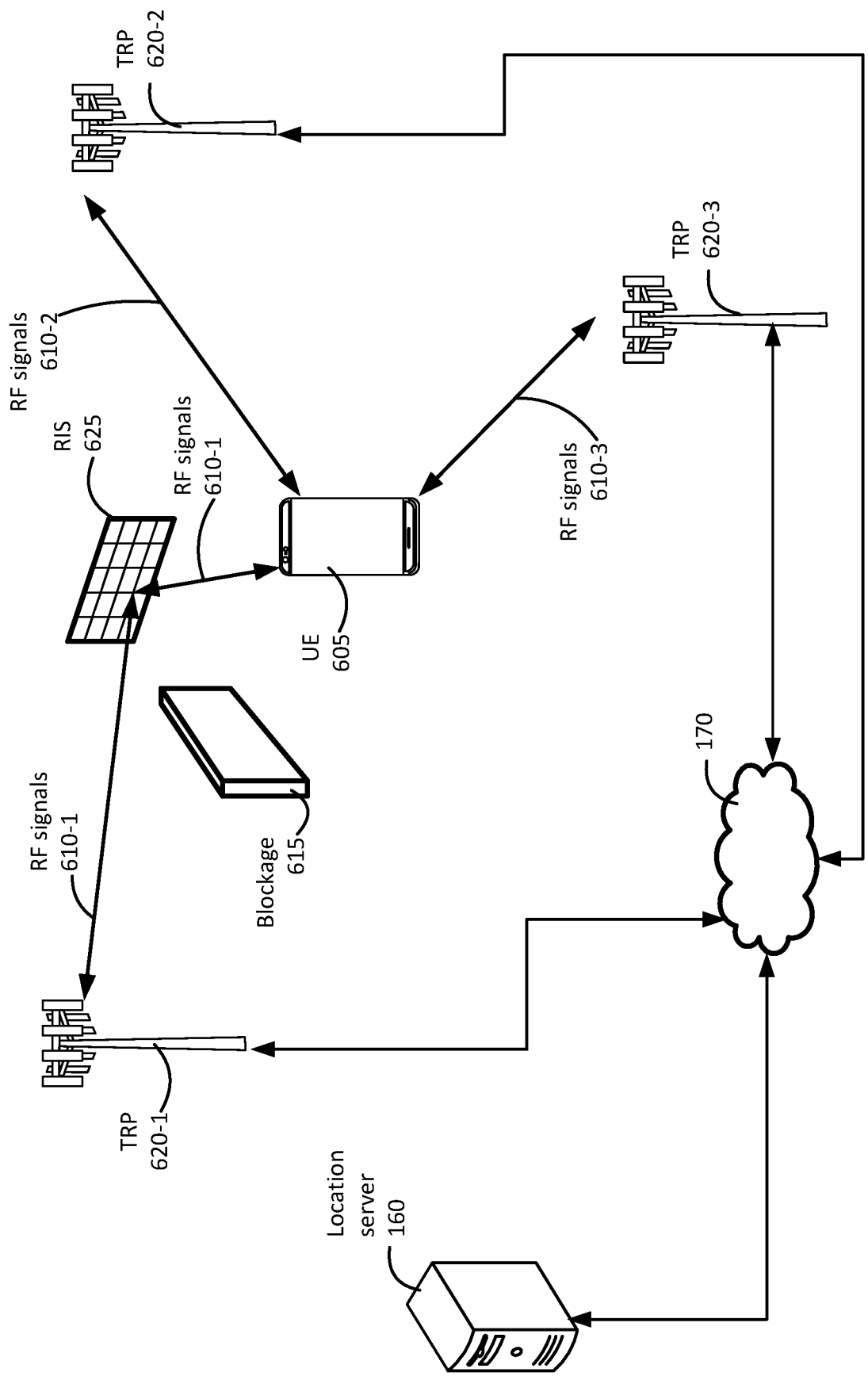
FIG. 6 is a simplified diagram of a configuration of a positioning system, illustrating how a Reconfigurable Intelligent Surface (RIS) generally may be used in a positioning system, according to an embodiment.

Embodiments address these and other issues related to double differential RTT and other positioning methods by leveraging reconfigurable intelligent surfaces (RISs) deployed within a wireless communication network. FIG. 6 and the accompanying description below provide some additional details regarding the use of RISs for positioning of a UE 505 in a wireless communication network.

FIG. 6 is a simplified diagram of a configuration in which positioning of a UE 605 may be made with the assistance of an RIS 625, according to an embodiment. Unlabeled arrows represent communication links. Communication between the UE 605 and a location server 160 may occur via one or more of the base stations 120 or via another communication link (not shown) between the UE 605 and network 170. (As used herein, "RIS-assisted" positioning of a UE 605 refers to positioning of the UE 605 with the use of an RIS 625.)

RISs (which also may be referred to as a software-controlled metasurfaces, intelligent reflecting surfaces, or reconfigurable reflect arrays/metasurfaces.) are garnering recent attention in wireless communication applications as a means to enable propagation paths for RF signals around blockage. Although the RIS 625 may be a passive device, it may comprise an array and may therefore redirect RF signals using beamforming. As such, the RIS 625 can enable wireless coverage of the TRP 620 (or, more broadly, the wireless network of the TRP 620) to extend to otherwise unreachable areas caused, for example, by blockage 615. The RIS 625 can do this using a software-controlled reflection/scattering profile to redirect wireless signals toward the UE 605 in real time. Additionally or alternatively, an RIS 625 may act as a repeater by receiving signals transmitted by a TRP 620-1 and directing them toward a UE 605. (As used herein, "directing," "redirecting," "reflecting," and similar terms used when referring to the functionality of the RIS 625 may refer to the reflecting and/or repeating functionality of an RIS.) The functionality of the RIS 625 can be controlled by the TRP 620-1 using a control channel, although alternative embodiments may enable a location server 160 and/or UE 605 to control the MS 625. In any case, this adds controllable paths to the channel between the TRP 620-1 and UE 605, which is useful in environments with severe blockage 615. Thus, for positioning purposes, RF signals 610-1 may be communicated between TRP 620-1 and UE 605, thereby enabling DL, UL, and DL-UL types of positioning, including modified versions of the RTT-based and TDOA-based positioning illustrated in FIGS. 3 and 4.

With regard to double differential RTT positioning, however, the application of RISs may not be straightforward. As previously noted, previous forms of double differential RTT positioning used wireless nodes capable of transmitting/receiving signals, as well as processing them. RISs are often passive devices incapable of transmitting/receiving signals on their own. Moreover, RISs often have little or no signal-processing capacity. However, when deployed, RISs have known locations.

Embodiments herein address these and other issues by utilizing OTA calibration schemes that can help reduce or eliminate TRP-side timing errors (both synchronization and group delay errors) by leveraging the signal-reflecting/beamforming capabilities and known location of a RIS, along with the processing and transmission/reception capabilities of a UE 605. In this manner, embodiments can enable RIS-assisted double differential RTT-based positioning and DL/UL TDOA-based positioning with TRP-side timing error cancellation. Details are provided hereafter with regard to FIGS. 7-12.

Figure 7:
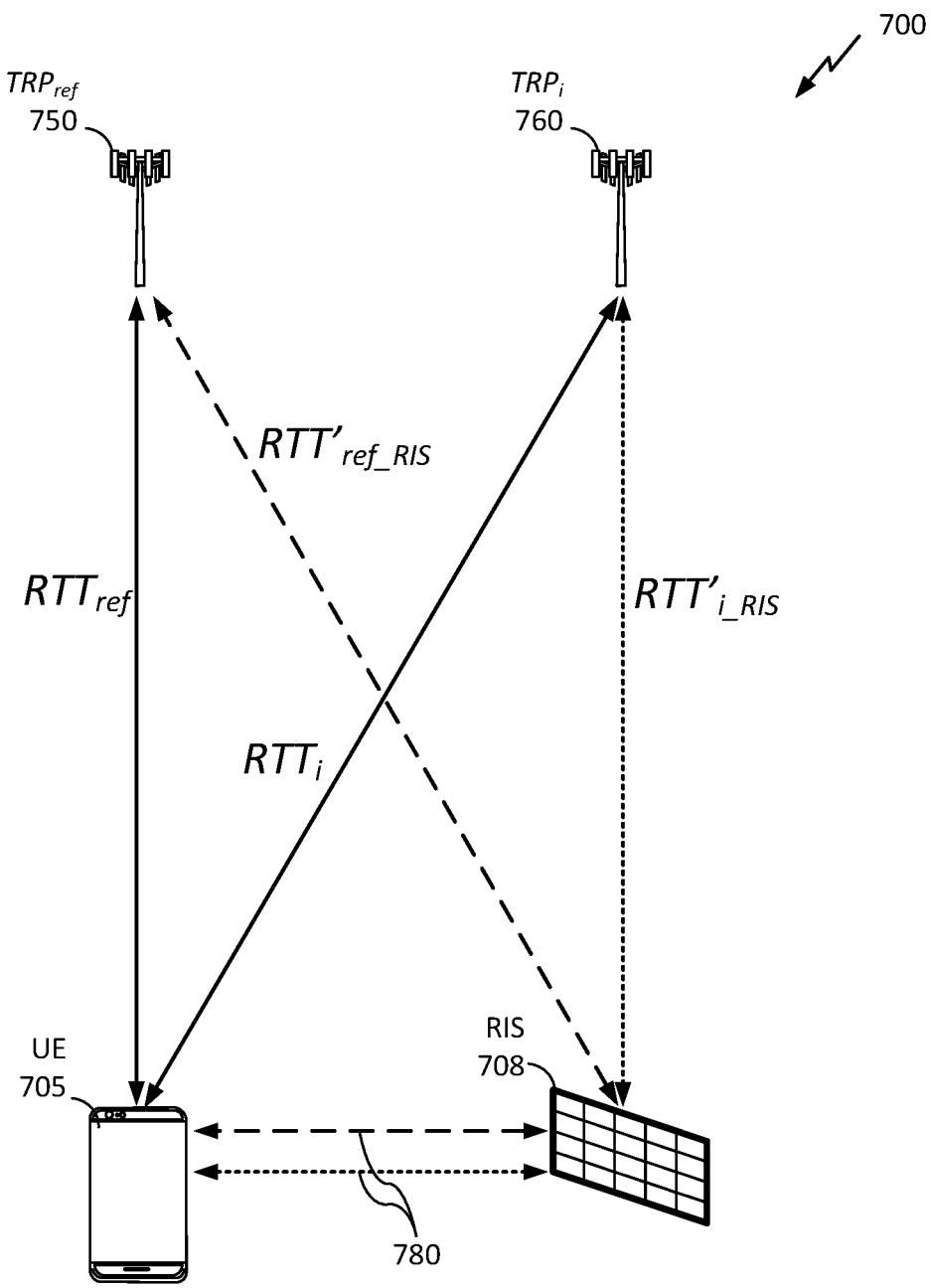
FIGS. 7-9 is are simplified diagrams of configurations, illustrating how a RIS and UE may be leveraged to take measurements for timing error calibration, according to an embodiment.

FIG. 7 is a simplified diagram of a configuration in which double differential RTT-based positioning of a UE 705 may be made with the assistance of an RIS 708, according to an embodiment. Here, dashed and dotted lines represent wireless reference signals (RF signals) transmitted to and reflected from the RIS 708 that correspond with new RTT measurements. Configuration 700 may seem similar in ways to the configuration 500 of FIG. 5. Importantly, however, processing and signal transmission/reception are performed by other entities, thereby enabling timing error cancellation.

Group delay at the TRPs 750 and 760 can be defined mathematically in terms of RTT measurements made by the UE 705 as follows:

$$GD_{\mathit{diff},TRPi\_ref} = GD_{TRPi} - GD_{TRPref} = RTT_i - RTT_{ref} - (T_{TRPi\_UE}), \quad (2)$$

where $GD_{TRPi}$ is the group delay at $TRP_i$ 760, $GD_{TRPref}$ is the group delay at $TRP_{ref}$ 750, and $GD_{\mathit{diff},TRPi\_ref}$ is the difference between these two delays. As further indicated in equation (2), this can further be calculated by subtracting $T_{TRPi\_UE}$ from the difference between $RTT_i$ and $RTT_{ref}$, where $T_{TRPi\_UE}$ is the difference between the double propagation time between $TRP_i$ 760 and UE 705 and the double propagation time between $TRP_{ref}$ 750 and UE 705. In two dimensions, this can be calculated as:

$$T_{TRPi\_UE} = 2*\sqrt{(x_{TRPi}-x_{UE})^2+(y_{TRPi}-y_{UE})^2}/c - 2*\sqrt{(x_{TRPref}-x_{UE})^2+(y_{TRPref}-y_{UE})^2}/c, \quad (3)$$

where $(x_{TRPi}, y_{TRPi})$, $(x_{TRPref}, y_{TRPref})$, and $(x_{UE}, y_{UE})$ are respective (x, y) coordinates of $TRP_i$ 760, $TRP_{ref}$ 750, and UE 705, and c is the speed of light. It can be noted that equation (3) and other equations herein using x and y coordinates are for 2-dimensional positioning. A person of ordinary skill in the art will appreciate that such equations can be modified for 3-dimensional positioning by adding a z coordinate, which may be used in a manner similar to the x and y coordinates.

Group delay at the TRPs 750 and 760 can also be defined mathematically in terms of RTT measurements made via the RIS 708 as follows:

$$GD_{\mathit{diff},TRPi\_ref} = GD_{TRPi} - GD_{TRPref} = RTT'_{i\_RIS} - RTT'_{ref\_RIS} - (T_{TRPi\_RIS}) \quad (4)$$

Here $T_{TRP\_i\_RIS}$ is the difference between (i) the double propagation time between $TRP_i$ 760 and RIS 708 and (ii) the double propagation time between TRPrer 750 and RIS 708. In two dimensions, this can be calculated as:

$$T_{TRPi\_UE} = 2*\sqrt{(x_{TRPi}-x_{UE})^2+(y_{TRPi}-y_{UE})^2}/c - 2*\sqrt{(x_{TRPref}-x_{UE})^2+(y_{TRPref}-y_{UE})^2}/c, \quad (5)$$

where $(x_{RIS}, y_{RIS})$ are respective (x, y) coordinates of RIS 708.

Notably, propagation times for wireless reference signals 780 traveling between RIS 708 and UE 705 are not included in equations (4) or (5) because these propagations times are substantially the same and therefore cancel each other out when the difference $RTT'_{i\_RIS} - RTT'_{ref\_RIS}$ is calculated. Any group delay at the RIS 708 would be common to RTT measurements taken via the RIS 708 and is therefore similarly canceled out. Further, RIS-assisted RTT measurements $RTT'_{i\_RIS}$ and $RTT'_{ref\_RIS}$ can be measured based on the UE's Rx-Tx time difference measurement (a report used in applicable 3GPP standards), thereby leveraging the UE's processing capabilities to calibrate for the RIS's limited capability for baseband processing, thereby enabling the RTT measurements to be taken.

Using equations (2) and (4), both the UE-side group delay and the group delay difference between each pair of TRPs can be removed:

$$T_{TRPi\_UE} - T_{TRPi\_RIS} = RTT_i - RTT_{ref} - (RTT'_{i\_RIS} - RTT'_{ref\_RIS}) \quad (6)$$

Because all RTT measurements and (x, y) coordinates of $TRP_i$ 760, $TRP_{ref}$ 750, and RIS 708 are known, this leaves (x, y) coordinates of the UE 705 as the only unknown variables in equations (3), (5), and (6). Thus, an RIS-assisted double differential RTT-based position of the UE 705, with group delay timing error correction, can be determined.

Compared with double differential RTT determination using the configuration 500 of FIG. 5, the RIS-assisted double differential RTT performed by the configuration 700 of FIG. 7 does not need to introduce PRS transmission/reception across TRPs. According to some embodiments, DL-PRS and UL-SRS could be used to perform the RTT measurements, and therefore embodiments may not need to introduce PRS transmission/reception across multiple TRPs. Ultimately, the traditional procedure for RTT positioning can largely be reused.

Additionally, to help ensure common hardware group delay among the various multiple RTT measurements taken, embodiments may ensure that RTT measurements (e.g., DL-PRS/UL-SRS transmissions) occur within a certain time threshold. This may be dependent on the capabilities of a TRP, UE, or RIS for maintaining group delay calibration for a certain amount of time. For example, a particular RIS 708 we provide its capabilities for maintaining group delay calibration for a certain amount of time (e.g., a capability of maintaining group delay variation within X ns during Y ms) to a location server that schedules the reference signals for RTT measurements, and the location server can then schedule the reference signals accordingly (e.g., within Y ms). For example, the location server may then schedule two pairs of DL-PRS/UL-SRS transmissions for RTT measurements through the RIS 708 within 10 ms, based on a reported capability of the RIS 708 of maintaining group delay variation within 1 ns during 10 ms. Of course, RIS capabilities can vary from RIS to RIS. The capabilities of the RIS may be reported to a location by a connected TRP (e.g., $TRP_i$ 760 or $TRP_{ref}$ 750), which may report group delay capabilities based on static information the TRP may have received when the RIS was originally deployed and/or dynamic information received from the MS. Static group delay information may be reported by the TRP at or near the beginning of a positioning session between the UE and location server in which RIS-assisted double differential RTT is to be performed, or when RIS-assisted double differential RTT positioning is requested by the UE or location server.

Some embodiments may further extend double-differencing correction to other types of positioning, in addition or as an alternative to RTT positioning.

Figure 8:
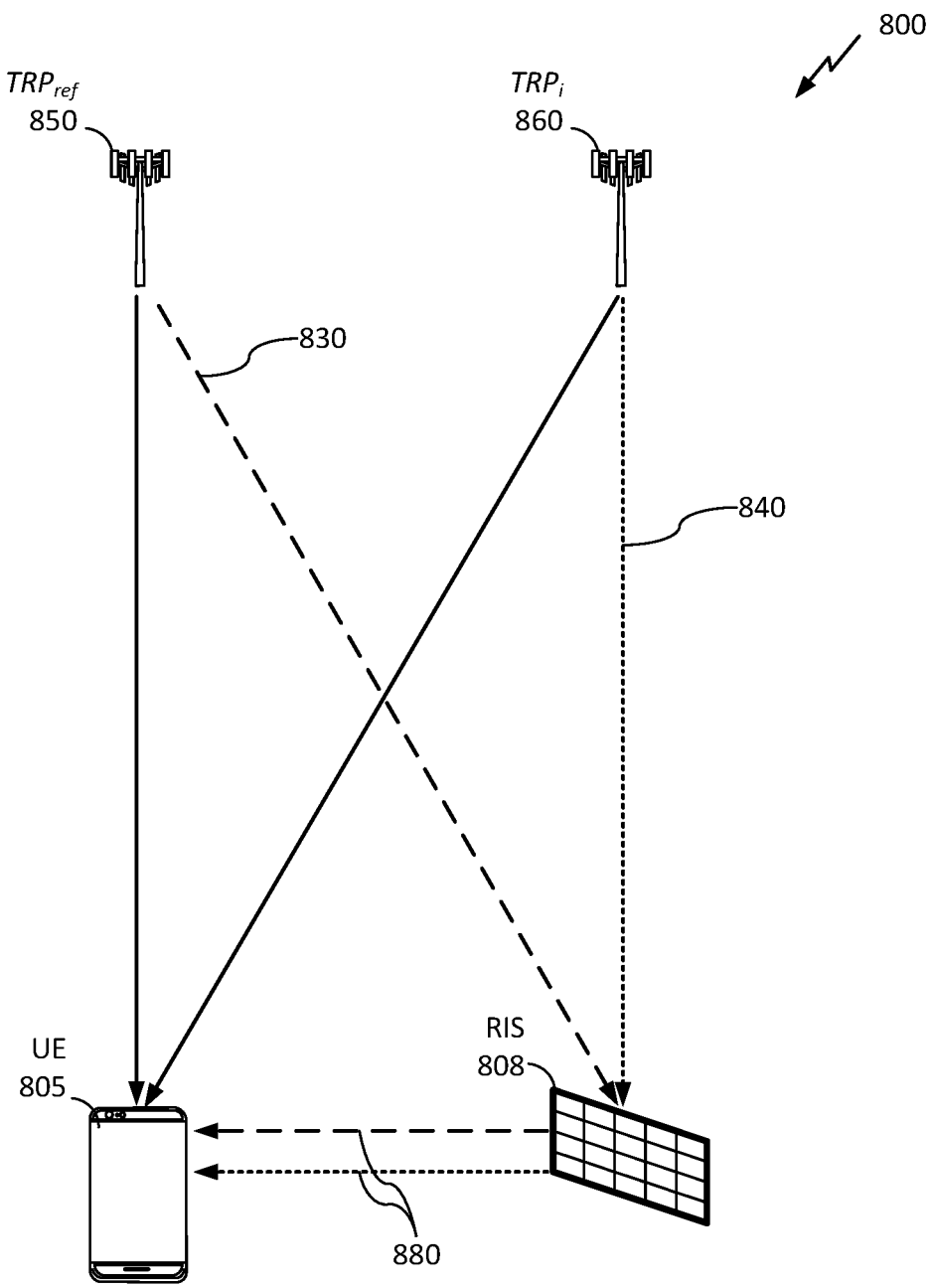

FIG. 8 is a diagram of a configuration 800 in which DL-TDOA positioning of the UE 805 can be made while accounting for the effects of network synchronization and TRP Tx timing errors (e.g., hardware group delay) with the use of the RIS 808. Here, the RSTD measurement error includes the network synchronization and TRP Tx timing errors, and may be defined mathematically as follows:

$$RSTD_{error} = RSTD_{RIS} - (T_{TRPi\_RIS}), \quad (7)$$

where $RSTD_{RIS}$ is the RSTD measurement made by the UE 808 that measures the time difference between two reference signals 830 and 840 (e.g., DL-PRS) reflected by the RIS 808 and received at the UE 805. The term $T_{TRPi\_RIS}$ is the difference between (i) the propagation time between $TRP_i$ 860 and the RIS 808 and (ii) a propagation time between $TRP_{ref}$ 850 and the RIS 808. Because the locations of TRPs 850, 860 and RIS 808 are known, this can be calculated as follows:

$$T_{TRPi\_UE} = 2 * \sqrt{(x_{TRPi} - x_{UE})^2 + (y_{TRPi} - y_{UE})^2}/c - \sqrt{(x_{TRPref} - x_{UE})^2 + (y_{TRPref} - y_{UE})^2}/c, \quad (8)$$

where $(x_{TRPi}, y_{TRPi})$, $(x_{TRPref}, y_{TRPref})$, and $(x_{RIS}, y_{RIS})$ are respective (x, y) coordinates of $TRP_i$ 860, $TRP_{ref}$ 850, and RIS 808, and c is the speed of light. Because all of these terms are known, $T_{TRPi\_RIS}$ can be determined, enabling the UE 805 to further determine $RSTD_{error}$.

As with the RIS-assisted double differential RTT example previously described, propagation times for wireless reference signals 880 traveling between RIS 808 and UE 805 are not included in equation (8) because these propagations times are substantially the same and therefore cancel each other out. Any group delay at the RIS 808 would be common to RTT measurements taken via the RIS 808 and is therefore similarly canceled out.

To help ensure common hardware group delay among the various multiple RTT measurements taken, embodiments may ensure that the transmission of reference signals 830 and 840 occur within a certain time threshold. This can be done in a manner similar to the RIS-assisted double differential RTT example previously described.

The removal of the $RSTD_{error}$ from the positioning of the UE 805 can be conducted in any of a variety of ways, depending on desired functionality. A first option can involve the UE 805 reporting should report RSTD error to the location server through serving cell. The report provided by the UE 805 can include IDs for the RIS 808, TRP (850, 860), and UE 805 ID, for each received reference signal, as well as a time stamp. A second option can involve the UE 805 reporting the measured $RSTD_{RIS}$ to the location server through serving cell, allowing the location server to calculate the $RSTD_{error}$. Again, the report can include IDs for the RIS 808, TRP (850, 860), and UE 805 ID, for each received reference signal, as well as a time stamp. A third option can involve the UE 805 conducting the RSTD measurement calibration locally (e.g., removing the $RSTD_{error}$ from the measured RSTD value) and report the calibrated RSTD to the location server. This third option, therefore, would calibrate the RSTD measurement in a process that would be completely transparent to the location server.

Figure 9:
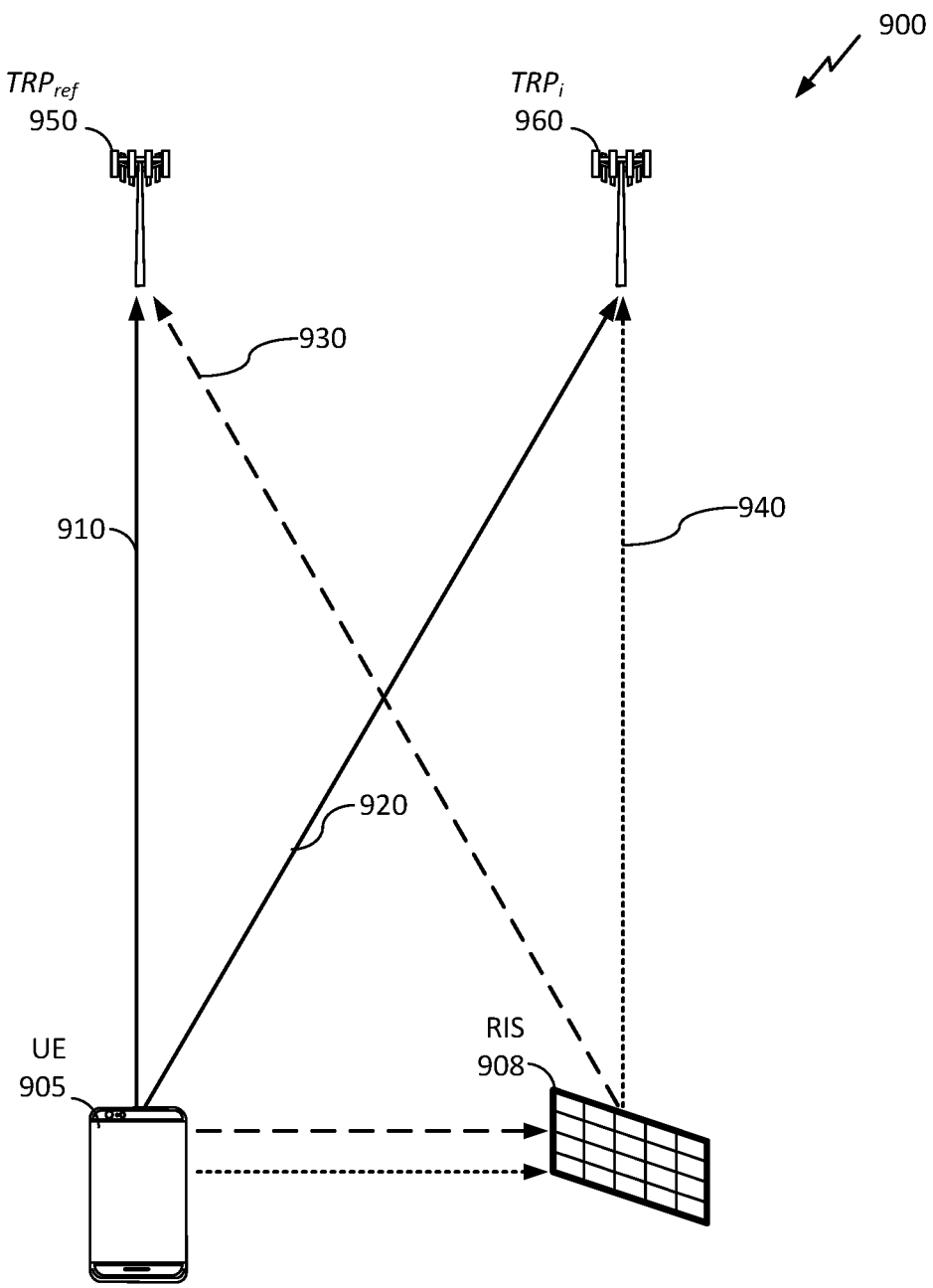

FIG. 9 is a diagram of a configuration 900 in which UL-TDOA positioning of the UE 805 can be made while accounting for the effects of network synchronization and TRP Rx timing errors (e.g., hardware group delay) with the use of the RIS 808. UL-TDOA positioning is based on UL-RTOA measurements made by TRPs 950 and 960 of reference signals (e.g., UL-SRS) sent from the UE 905, both directly (direct wireless reference signals 910 and 920) and indirectly via the RIS 908 (wireless reference signals 930 and 940). Errors in the UL-TDOA measurements, on which the UL-TDOA positioning is based, can be described mathematically as follows:

$$UL\_RTOA_{error} = UL\_RTOA_{i\_RIS} - UL\_RTOA_{ref\_RIS} - (T_{TRPi\_RIS}). \quad (9)$$

where $UL\_RTOA_{i\_RIS}$ is the UL-TDOA measurement at $TRP_i$ of signal 940 reflected from RIS 908; and $UL\_RTOA_{ref\_RIS}$ is the UL-TDOA measurement at $TRP_{ref}$ of signal 930 reflected from RIS 908. The term $T_{TRPi\_RIS}$ is the difference between the propagation time between (i) $TRP_i$ 960 and the RIS 908 and (ii) a propagation time between $TRP_{ref}$ 950 and the RIS 908. Because the location of TRPs 950, 960 and RIS 908 are known, this can be calculated as follows:

$$T_{TRPi\_UE} = 2 \ast \sqrt{(x_{TRPi} - x_{UE})^2 + (y_{TRPi} - y_{UE})^2}/c - \sqrt{(x_{TRPref} - x_{UE})^2 + (y_{TRPref} - y_{UE})^2}/c, \quad (10)$$

where $(x_{TRPi}, y_{TRPi})$, $(x_{TRPref}, y_{TRPref})$, and $(x_{RIS}, y_{RIS})$ are respective (x, y) coordinates of $TRP_i$ 960, $TRP_{ref}$ 950, and RIS 908, and c is the speed of light. Because all of these terms are known, $T_{TRPi\_RIS}$ can be determined, enabling the location server to further determine $RSTD_{error}$.

To enable this calculation, UL-RTOA measurements are provided in reports from $TRP_i$ 960 and $TRP_{ref}$ 950 to the location server. These reports can include IDs for the RIS 908 TRP 950, 960 and UE 905, along with a time stamp. The location server can then derive the timing error $RSTD_{error}$ based on these reported UL-RTOA. The location server can then calibrate the $RSTD_{error}$ for each pair of UL-RTOA for the UL-TDOA-based UE location estimation.

Embodiments are not limited to the configurations 700, 800, and 900 illustrated in FIGS. 7-9. For example, some embodiments may utilize one or more additional TRPs and/or one or more additional RISs. Such additional TRPs and RISs can be used in the manner of the previously-described embodiments to obtain additional measurements, which can be used (e.g., by averaging determined measurements, errors, positioning determinations, etc.) to provide even more accurate timing error calibration.

Figure 10:
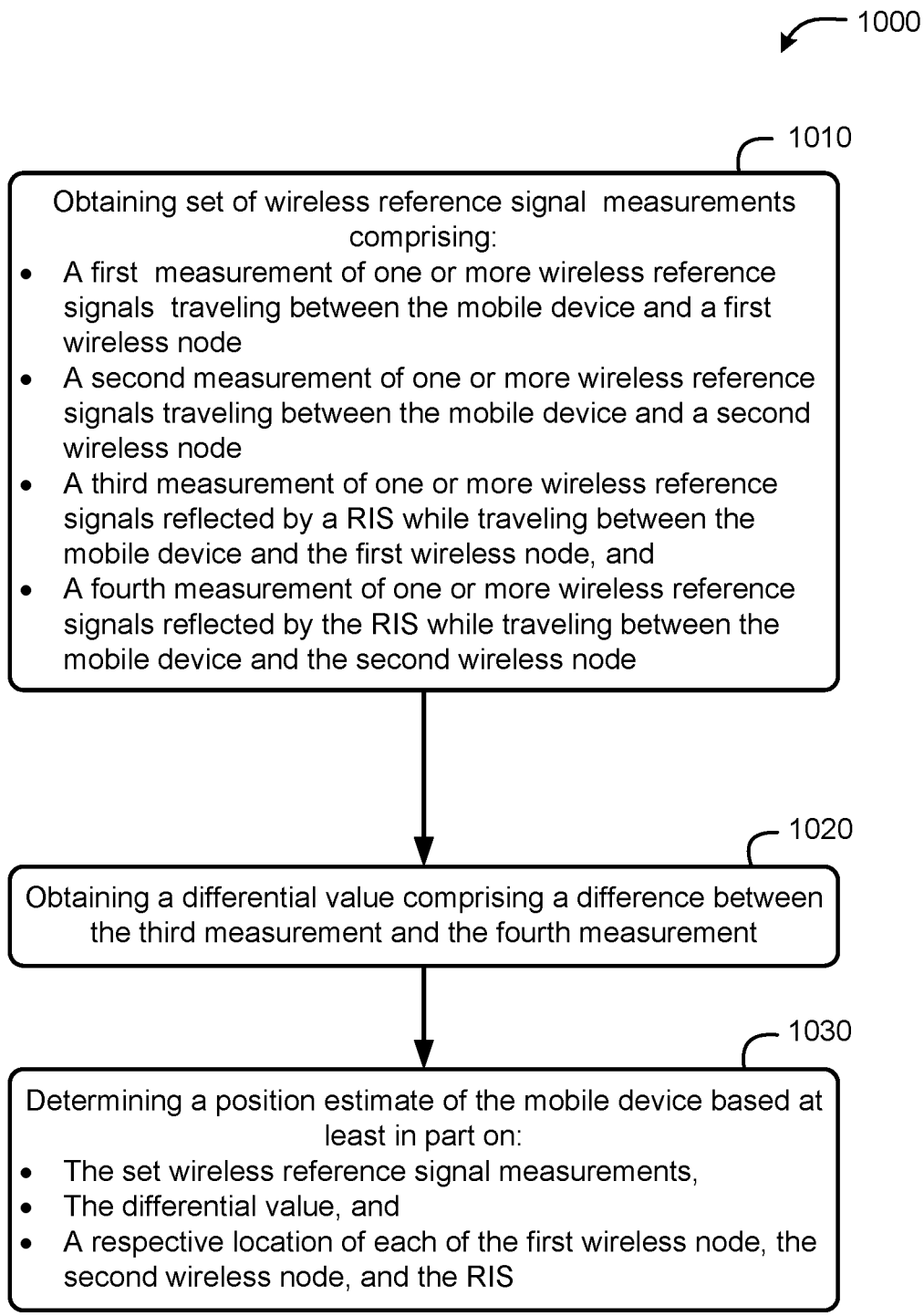
FIG. 10 is a flow diagram of a method of RIS-assisted calibration for timing errors in wireless nodes used in position determination of a mobile device, according to an embodiment.

FIG. 10 is a flow diagram of a method 1000 of MS-assisted calibration for timing errors in wireless nodes used in position determination of a mobile device, according to an embodiment. Means for performing the functionality illustrated in one or more of the blocks shown in FIG. 10 may be performed by hardware and/or software components of a mobile device (e.g., UE 105) or computer system (e.g., location server 160). Example components of a mobile device are illustrated in FIG. 11, an example components of a computer system are illustrated in FIG. 12, which are described in more detail below.

At block 1010, the functionality comprises obtaining set of wireless reference signal measurements comprising a first measurement of one or more wireless reference signals traveling between the mobile device and a first wireless node, a second measurement of one or more wireless reference signals traveling between the mobile device and a second wireless node, a third measurement of one or more wireless reference signals reflected by a RIS while traveling between the mobile device and the first wireless node, and a fourth measurement of one or more wireless reference signals reflected by the RIS while traveling between the mobile device and the second wireless node. As indicated in FIGS. 7-9, wireless nodes may comprise TRPs. Additionally or alternatively, wireless nodes may comprise other mobile devices or UEs, for example, having known locations. Embodiments may allow for configurations with any combination of TRPs and/or mobile devices as wireless nodes. Where one or more of the wireless nodes comprise TRPs, first and second measurements may comprise UL, DL, and/or UL-DL, measurements between the mobile device and TRPs. Third and fourth measurements may comprise similar measurements of signals relayed via the RIS. UL measurements may comprise, for example, UL-RTOA measurements of reference signals (e.g., UL-SRS) sent by the mobile device that can be used for UL-TDOA-based positioning of the mobile device, as previously described in relation to a FIG. 9. DL measurements may comprise, for example, RSTD measurements of reference signals (e.g., DL-PRS) sent by TRPs that can be used for DL-TDOA-based positioning of the mobile device, as previously described in relation to a FIG. 8. UL-DL measurements may comprise, for example, RTT measurements of and signals (e.g., UL-SRS/DL-PRS) sent between the UE and TRPs that can be used for RTT-based positioning of the mobile device, as previously described in relation to a FIG. 7. Where one or more of the wireless nodes comprise mobile devices, SL measurements may be made in place of UL, DL, and/or UL-DL measurements as previously described. In embodiments in which the functionality of block 1010 is performed by the mobile device, obtaining the set of wireless reference signals may comprise taking one or more of the measurements, which, in some instances, may comprise exchanging some information with the one or more wireless nodes in addition to the reference signals. Alternatively, in embodiments in which the functionality of block 1010 is performed by a location server, obtaining the set of wireless reference signal measurements may comprise receiving measurements from the wireless nodes and/or mobile device.

Figure 11:
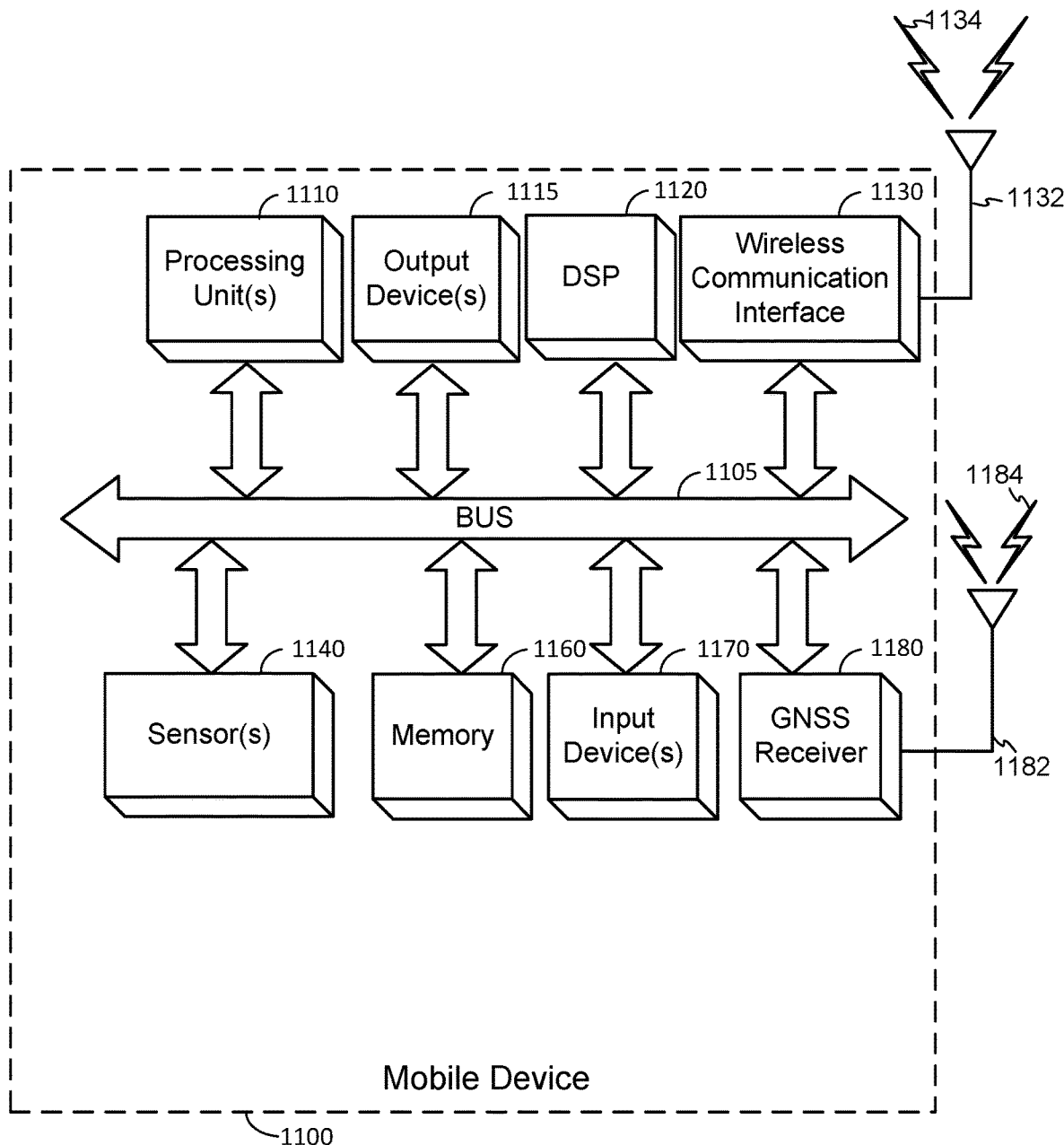
FIG. 11 is a block diagram of an embodiment of a mobile device, which can be utilized in embodiments as described herein.
Figure 12:
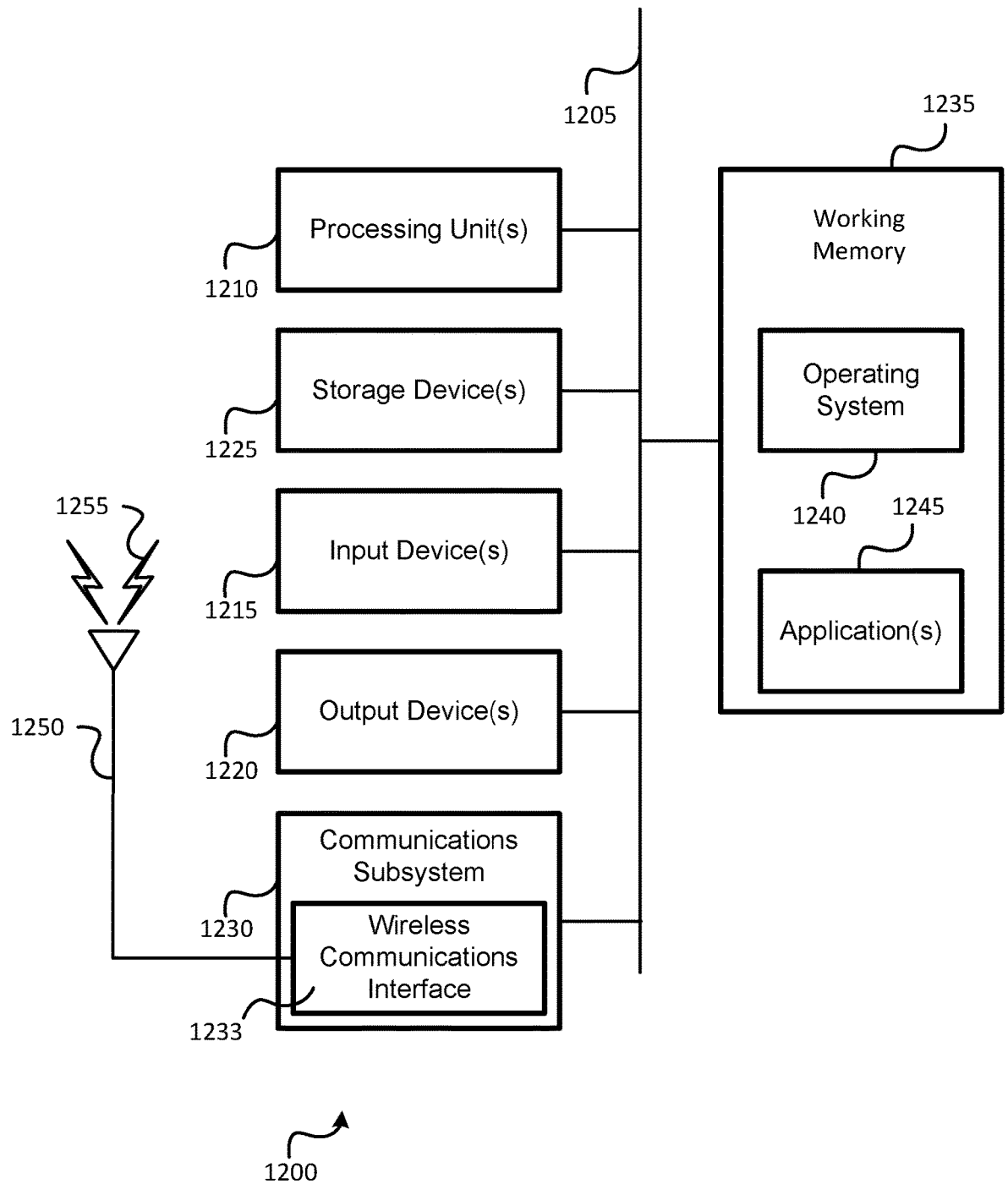
FIG. 12 is a block diagram of an embodiment of a computer system, which can be utilized in embodiments as described herein.

Means for performing functionality at block 1010 may comprise, for example, a bus 1105, processing unit(s) 1110, Digital Signal Processor (DSP) 1120, wireless communication interface 1130, memory 1160, and/or other components of a mobile device as illustrated in FIG. 11; or a bus 1205, processing unit(s) 1210, communications subsystem 1230, working memory 1235, and/or other components of a computer system as illustrated in FIG. 12.

At block 1020, the functionality comprises obtaining a differential value comprising a difference between the third measurement and the fourth measurement. This differential value may vary, depending on the type of measurements/positioning being performed. For example, for RTT-based positioning, a differential value may comprise a difference between RTT measurements of signals reflected from the RIS, as shown in equations (4) and (6). For DL-TDOA positioning, this differential value may comprise an RSTD measurement of a time difference between the third and fourth measurements (which may comprise ToA measurements of reference signals), as shown in equation (7). For UL-TDOA positioning, this differential value may comprise a time difference between UL-TDOA (or SL-TDOA) measurements made at the wireless nodes of signals reflecting from the RIS, as shown in equation (9).

Again, depending on the device performing the operation at block 1020, the operation itself may be performed in different ways. A location server, for example, may obtain a calculated differential value from wireless nodes and/or the mobile device. Alternatively, the location server may receive measurements made by the wireless nodes and/or the mobile device, then calculate the differential value based on the measurements. According to some embodiments, the mobile device can obtain the differential value by receiving the differential value from one or more of the wireless nodes, or calculating the differential value based on its own measurements and/or measurements received from the wireless nodes.

Means for performing functionality at block 1020 may comprise, for example, a bus 1105, processing unit(s) 1110, DSP 1120, wireless communication interface 1130, memory 1160, and/or other components of a mobile device as illustrated in FIG. 11; or a bus 1205, processing unit(s) 1210, communications subsystem 1230, working memory 1235, and/or other components of a computer system as illustrated in FIG. 12.

At block 1030, the functionality comprises determining a position estimate of the mobile device based at least in part on the set wireless reference signal measurements, the differential value, and a respective location of each of the first wireless node, the second wireless node, and the MS. This determination can be made, for example, using a portion of equations (2)-(10) relevant to the type of measurements/positioning to determine and calibrate for the timing error, or calculating the position of the mobile device itself.

Means for performing functionality at block 1030 may comprise, for example, a bus 1105, processing unit(s) 1110, DSP 1120, wireless communication interface 1130, memory 1160, and/or other components of a mobile device as illustrated in FIG. 11; or a bus 1205, processing unit(s) 1210, communications subsystem 1230, working memory 1235, and/or other components of a computer system as illustrated in FIG. 12.

As noted, embodiments may include any of a variety of additional features, depending on desired functionality. For example, according to some embodiments, the method 1000 may be performed by a computer system (e.g., a location server) in communication with the mobile device. As previously noted, in such embodiments, determining the position estimate may comprise receiving, at the computer system, the measurements made by the mobile device.

The functionality for the performance of RTT-based positioning of the mobile device may include additional features. In such embodiments, the first measurement, the second measurement, the third measurement, and the fourth measurement may each comprise a respective RTT measurement. Determining the position estimate of the mobile device may further comprise determining a difference between the differential value and a second differential value, where the second of parenteral value comprises a difference between the third measurement and the fourth measurement. In such embodiments, the method 1000 may be performed by the mobile device or a computer server.

The functionality for the performance of DL-TDOA-based positioning of the mobile device may include additional features. For example, in such embodiments, the one or more wireless reference signals of each of first measurement, the second measurement, the third measurement, and the fourth measurement may comprise a DL reference signal or an SL reference signal received by the mobile device, and the differential value may comprise an RSTD measurement based on the third measurement and the fourth measurement. In such embodiments, determining the position estimate of the mobile device further comprises estimating a timing error based at least in part on the RSTD measurement based on the third measurement and the fourth measurement, and the respective location of each of the first wireless node, the second wireless node, and the MS. The mobile device may determine the RSTD measurement and send the RSTD measurement to a computer server, the mobile device may determine the timing error and sends the timing error to a computer server, or the mobile device itself may determine the position estimate.

The functionality for the performance of UL-TDOA-based positioning of the mobile device may include additional features. In such embodiments, the one or more wireless reference signals of each of first measurement, the second measurement, the third measurement, and the fourth measurement may each comprise a UL reference signal or an SL reference signal transmitted by the mobile device. The third measurement may comprise a first TOA measurement (e.g., UL-RTOA), the fourth measurement may comprise a second TOA measurement (e.g., UL-RTOA), and the differential value may comprise a time difference between the first TOA measurement and the second TOA measurement. In such embodiments, determining the position estimate of the mobile device may further comprise estimating a timing error based at least in part on the differential value, and the respective location of each of the first wireless node, the second wireless node, and the RIS. Moreover, in such embodiments, the method 1000 may be performed by a computer server.

FIG. 11 illustrates an embodiment of a mobile device 1100, which can be utilized as a UE or mobile device as described herein above (e.g., in association with FIGS. 1-10). For example, the mobile device 1100 can perform one or more of the functions of the method shown in FIG. 10. It should be noted that FIG. 11 is meant only to provide a generalized illustration of various components, any or all of which may be utilized as appropriate. Furthermore, as previously noted, the functionality of the UE discussed in the previously described embodiments may be executed by one or more of the hardware and/or software components illustrated in FIG. 11.

The mobile device 1100 is shown comprising hardware elements that can be electrically coupled via a bus 1105 (or may otherwise be in communication, as appropriate). The hardware elements may include a processing unit(s) 1110 which can include without limitation one or more general-purpose processors, one or more special-purpose processors (such as DSP chips, graphics acceleration processors, application specific integrated circuits (ASICs), and/or the like), and/or other processing structures or means. As shown in FIG. 11, some embodiments may have a separate DSP 1120, depending on desired functionality. Location determination and/or other determinations based on wireless communication may be provided in the processing unit(s) 1110 and/or wireless communication interface 1130 (discussed below). The mobile device 1100 also can include one or more input devices 1170, which can include without limitation one or more keyboards, touch screens, touch pads, microphones, buttons, dials, switches, and/or the like; and one or more output devices 1115, which can include without limitation one or more displays (e.g., touch screens), light emitting diodes (LEDs), speakers, and/or the like.

The mobile device 1100 may also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 1100 to communicate with other devices as described in the embodiments above. The wireless communication interface 1130 may include one or more wireless transceivers that permit data and signaling to be communicated (e.g., transmitted and received) with base stations/TRPs of a network (e.g., including eNBs, gNBs, ng-eNBs), access points, various base stations and/or other access node types, and/or other network components, computer systems, and/or any other electronic devices (UEs/mobile devices, etc.) communicatively coupled with base stations/TRPs, as described herein. The communication can be carried out via one or more wireless communication antenna(s) 1132 that send and/or receive wireless signals 1134. According to some embodiments, the wireless communication antenna(s) 1132 may comprise a plurality of discrete antennas, antenna arrays, or any combination thereof.

Depending on desired functionality, the wireless communication interface 1130 may comprise a separate receiver and transmitter, or any combination of transceivers, transmitters, and/or receivers to communicate with base stations/TRPs (e.g., ng-eNBs and gNBs) and other terrestrial transceivers, such as wireless devices and access points. The mobile device 1100 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 1100 can further include sensor(s) 1140. Sensors 1140 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile device 1100 may also include a GNSS receiver 1180 capable of receiving signals 1184 from one or more GNSS satellites using an antenna 1182 (which could be the same as antenna 1132). Positioning based on GNSS signal measurement can be utilized to complement and/or incorporate the techniques described herein. The GNSS receiver 1180 can extract a position of the mobile device 1100, using conventional techniques, from GNSS satellites 110 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1180 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1180 is illustrated in FIG. 11 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1110, DSP 1120, and/or a processing unit within the wireless communication interface 1130 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1110 or DSP 1120.

The mobile device 1100 may further include and/or be in communication with a memory 1160. The memory 1160 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1160 of the mobile device 1100 also can comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the mobile device 1100 (and/or processing unit(s) 1110 or DSP 1120 within mobile device 1100). In an aspect, then such code and/or instructions can be used to configure and/or adapt a general-purpose computer (or other device) to perform one or more operations in accordance with the described methods.

FIG. 12 is a block diagram of an embodiment of a computer system 1200, which may be used, in whole or in part, to provide the functions of one or more network components as described in the embodiments herein (e.g., location server 160 of FIGS. 1 and 6 or LMF of FIG. 2). For example, the computer system 1200 can perform one or more of the functions of the method shown in FIG. 10. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processing unit(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may comprise one or more wireless transceivers that may send and receive wireless signals 1255 (e.g., signals according to 5G NR or LTE) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a UE/mobile device, base stations and/or other TRPs, and/or any other electronic devices described herein. Hence, the communications subsystem 1230 may be used to receive and send data as described in the embodiments herein.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of reconfigurable intelligent surface (RIS)-assisted calibration for timing errors in wireless nodes used in position determination of a mobile device, the method comprising: obtaining a set of wireless reference signal measurements comprising: a first measurement of one or more wireless reference signals traveling between the mobile device and a first wireless node; a second measurement of one or more wireless reference signals traveling between the mobile device and a second wireless node; a third measurement of one or more wireless reference signals reflected by a RIS while traveling between the mobile device and the first wireless node; and a fourth measurement of one or more wireless reference signals reflected by the RIS while traveling between the mobile device and the second wireless node; obtaining a differential value comprising a difference between the third measurement and the fourth measurement; and determining a position estimate of the mobile device based at least in part on: the set of wireless reference signal measurements, the differential value, and a respective location of each of the first wireless node, the second wireless node, and the RIS.

Clause 2. The method of clause 1, wherein the method is performed by a computer server in communication with the mobile device, and wherein determining the position estimate comprises receiving, at the computer system, the measurements made by the mobile device.

Clause 3. The method of clause 1, wherein: the first measurement, the second measurement, the third measurement, and the fourth measurement each comprise a respective Round-Trip Time (RTT) measurement; and determining the position estimate of the mobile device further comprises determining a difference between the differential value and a second differential value, the second differential value comprising a difference between the third measurement and the fourth measurement.

Clause 4. The method of clause 3, wherein the method is performed by the mobile device or a computer server.

Clause 5. The method of clause 1, wherein: the one or more wireless reference signals of each of the first measurement, the second measurement, the third measurement, and the fourth measurement comprise a downlink (DL) reference signal or a sidelink (SL) reference signal received by the mobile device; the differential value comprises a Reference Signal Time Difference (RSTD) measurement based on the third measurement and the fourth measurement; and determining the position estimate of the mobile device further comprises estimating a timing error based at least in part on: the RSTD measurement based on the third measurement and the fourth measurement, and the respective location of each of the first wireless node, the second wireless node, and the RIS.

Clause 6. The method of clause 5, wherein the mobile device determines the RSTD measurement and sends the RSTD measurement to a computer server.

Clause 7. The method of clause 5 or 6, wherein the mobile device determines the timing error and sends the timing error to a computer server.

Clause 8. The method of any of clauses 5-7, wherein the mobile device determines the position estimate.

Clause 9. The method of clause 1, wherein: the one or more wireless reference signals of each of the first measurement, the second measurement, the third measurement, and the fourth measurement comprise an uplink (UL) reference signal or sidelink (SL) reference signal transmitted by the mobile device; the third measurement comprises a first time of arrival (TOA) measurement; the fourth measurement comprises a second TOA measurement; the differential value comprises a time difference between the first TOA measurement and the second TOA measurement; and determining the position estimate of the mobile device further comprises estimating a timing error based at least in part on: the differential value, and the respective location of each of the first wireless node, the second wireless node, and the MS.

Clause 10. The method of clause 9, wherein the method is performed by a computer server.

Clause 11. A device for reconfigurable intelligent surface (RIS)-assisted calibration for timing errors in wireless nodes used in position determination of a mobile device, the device comprising: a transceiver; a memory; and one or more processing units communicatively coupled with the transceiver and the memory, the one or more processing units configured to: obtain, via the transceiver, a set of wireless reference signal measurements comprising: a first measurement of one or more wireless reference signals traveling between the mobile device and a first wireless node; a second measurement of one or more wireless reference signals traveling between the mobile device and a second wireless node; a third measurement of one or more wireless reference signals reflected by a RIS while traveling between the mobile device and the first wireless node; and a fourth measurement of one or more wireless reference signals reflected by the RIS while traveling between the mobile device and the second wireless node; obtain a differential value comprising a difference between the third measurement and the fourth measurement; and determine a position estimate of the mobile device based at least in part on: the set of wireless reference signal measurements, the differential value, and a respective location of each of the first wireless node, the second wireless node, and the RIS.

Clause 12. The device of clause 11, wherein the device comprises a computer server in communication with the mobile device, and wherein, to determine the position estimate, the one or more processing units are configured to receive, via the transceiver, the measurements made by the mobile device.

Clause 13. The device of clause 11, wherein: the first measurement, the second measurement, the third measurement, and the fourth measurement each comprise a respective Round-Trip Time (RTT) measurement; and to determine the position estimate of the mobile device, the one or more processing units are configured to determine a difference between the differential value and a second differential value, the second differential value comprising a difference between the third measurement and the fourth measurement.

Clause 14. The device of clause 13, wherein the device comprises the mobile device or a computer server.

Clause 15. The device of clause 11, wherein: the one or more wireless reference signals of each of the first measurement, the second measurement, the third measurement, and the fourth measurement comprise a downlink (DL) reference signal or a sidelink (SL) reference signal received by the mobile device; the differential value comprises a Reference Signal Time Difference (RSTD) measurement based on the third measurement and the fourth measurement; and to determine the position estimate of the mobile device, the one or more processing units are configured to estimate a timing error based at least in part on: the RSTD measurement based on the third measurement and the fourth measurement, and the respective location of each of the first wireless node, the second wireless node, and the RIS.

Clause 16. The device of clause 15, wherein the device comprises the mobile device, and wherein the one or more processing units are further configured to determine the RSTD measurement and send, via the transceiver, the RSTD measurement to a computer server.

Clause 17. The device of clause 15 or 16, wherein the one or more processing units are further configured to determine the timing error and send, via the transceiver, the timing error to a computer server.

Clause 18. The device of any of clauses 15-17, wherein the one or more processing units are further configured to determine the position estimate.

Clause 19. The device of clause 11, wherein: the one or more wireless reference signals of each of the first measurement, the second measurement, the third measurement, and the fourth measurement comprise an uplink (UL) reference signal or sidelink (SL) reference signal transmitted by the mobile device; the third measurement comprises a first time of arrival (TOA) measurement; the fourth measurement comprises a second TOA measurement; the differential value comprises a time difference between the first TOA measurement and the second TOA measurement; and to determine the position estimate of the mobile device, the one or more processing units are configured to estimate a timing error based at least in part on: the differential value, and the respective location of each of the first wireless node, the second wireless node, and the RIS.

Clause 20. The device of clause 19, wherein the device comprises a computer server.

Clause 21. A device for reconfigurable intelligent surface (RIS)-assisted calibration for timing errors in wireless nodes used in position determination of a mobile device, the device comprising: means for obtaining a set of wireless reference signal measurements comprising: a first measurement of one or more wireless reference signals traveling between the mobile device and a first wireless node; a second measurement of one or more wireless reference signals traveling between the mobile device and a second wireless node; a third measurement of one or more wireless reference signals reflected by a RIS while traveling between the mobile device and the first wireless node; and a fourth measurement of one or more wireless reference signals reflected by the RIS while traveling between the mobile device and the second wireless node; means for obtaining a differential value comprising a difference between the third measurement and the fourth measurement; and means for determining a position estimate of the mobile device based at least in part on: the set of wireless reference signal measurements, the differential value, and a respective location of each of the first wireless node, the second wireless node, and the RIS.

Clause 22. The device of clause 21, wherein the means for determining the position estimate comprises means for receiving, at the device, the measurements made by the mobile device.

Clause 23. The device of clause 21, wherein: the first measurement, the second measurement, the third measurement, and the fourth measurement each comprise a respective Round-Trip Time (RTT) measurement; and the means for determining the position estimate of the mobile device further comprises means for determining a difference between the differential value and a second differential value, the second differential value comprising a difference between the third measurement and the fourth measurement.

Clause 24. The device of clause 23, wherein the device comprises the mobile device or a computer server.

Clause 25. The device of clause 21, wherein: the one or more wireless reference signals of each of the first measurement, the second measurement, the third measurement, and the fourth measurement comprise a downlink (DL) reference signal or a sidelink (SL) reference signal received by the mobile device; the differential value comprises a Reference Signal Time Difference (RSTD) measurement based on the third measurement and the fourth measurement; and the means for determining the position estimate of the mobile device further comprises means for estimating a timing error based at least in part on: the RSTD measurement based on the third measurement and the fourth measurement, and the respective location of each of the first wireless node, the second wireless node, and the RIS.

Clause 26. The device of clause 25, wherein the device comprises the mobile device, and wherein the device further comprises means for determining the RSTD measurement and means for sending the RSTD measurement to a computer server.

Clause 27. The device of clause 25 or 26, wherein the device comprises the mobile device, and wherein the device further comprises means for determining the timing error and means for sending the timing error to a computer server.

Clause 28. The device of any of clauses 25-27, wherein the device comprises the mobile device, and wherein the device further comprises means for determining the position estimate.

Clause 29. The device of clause 21, wherein: the one or more wireless reference signals of each of the first measurement, the second measurement, the third measurement, and the fourth measurement comprise an uplink (UL) reference signal or sidelink (SL) reference signal transmitted by the mobile device; the third measurement comprises a first time of arrival (TOA) measurement; the fourth measurement comprises a second TOA measurement; the differential value comprises a time difference between the first TOA measurement and the second TOA measurement; and the means for determining the position estimate of the mobile device further comprises estimating a timing error based at least in part on: the differential value, and the respective location of each of the first wireless node, the second wireless node, and the RIS.

Clause 30. A non-transitory computer-readable medium storing instructions for reconfigurable intelligent surface (RIS)-assisted calibration for timing errors in wireless nodes used in position determination of a mobile device, the instructions comprising code for: obtaining a set of wireless reference signal measurements comprising: a first measurement of one or more wireless reference signals traveling between the mobile device and a first wireless node; a second measurement of one or more wireless reference signals traveling between the mobile device and a second wireless node; a third measurement of one or more wireless reference signals reflected by a RIS while traveling between the mobile device and the first wireless node; and a fourth measurement of one or more wireless reference signals reflected by the RIS while traveling between the mobile device and the second wireless node; obtaining a differential value comprising a difference between the third measurement and the fourth measurement; and determining a position estimate of the mobile device based at least in part on: the set of wireless reference signal measurements, the differential value, and a respective location of each of the first wireless node, the second wireless node, and the RIS.

What is claimed is:

1. A method of reconfigurable intelligent surface (RIS)-assisted calibration for timing errors in wireless nodes used in position determination of a mobile device, the method comprising:
   obtaining a set of wireless reference signal measurements comprising:
      a first measurement of one or more wireless reference signals traveling between the mobile device and a first wireless node;
      a second measurement of one or more wireless reference signals traveling between the mobile device and a second wireless node;
      a third measurement of one or more wireless reference signals reflected by a RIS while traveling between the mobile device and the first wireless node; and
      a fourth measurement of one or more wireless reference signals reflected by the RIS while traveling between the mobile device and the second wireless node;
   obtaining a differential value comprising a difference between the third measurement and the fourth measurement; and
   determining a position estimate of the mobile device based at least in part on:
      the set of wireless reference signal measurements,
      the differential value, and
      a respective location of each of the first wireless node, the second wireless node, and the RIS.

2. The method of claim 1, wherein the method is performed by a computer server in communication with the mobile device, and wherein determining the position estimate comprises receiving, at the computer system, the measurements made by the mobile device.

3. The method of claim 1, wherein:
   the first measurement, the second measurement, the third measurement, and the fourth measurement each comprise a respective Round-Trip Time (RTT) measurement; and
   determining the position estimate of the mobile device further comprises determining a difference between the differential value and a second differential value, the second differential value comprising a difference between the third measurement and the fourth measurement.

4. The method of claim 3, wherein the method is performed by the mobile device or a computer server.

5. The method of claim 1, wherein:
   the one or more wireless reference signals of each of the first measurement, the second measurement, the third measurement, and the fourth measurement comprise a downlink (DL) reference signal or a sidelink (SL) reference signal received by the mobile device;
   the differential value comprises a Reference Signal Time Difference (RSTD) measurement based on the third measurement and the fourth measurement; and
   determining the position estimate of the mobile device further comprises estimating a timing error based at least in part on:
      the RSTD measurement based on the third measurement and the fourth measurement, and
      the respective location of each of the first wireless node, the second wireless node, and the RIS.

6. The method of claim 5, wherein the mobile device determines the RSTD measurement and sends the RSTD measurement to a computer server.

7. The method of claim 5, wherein the mobile device determines the timing error and sends the timing error to a computer server.

8. The method of claim 5, wherein the mobile device determines the position estimate.

9. The method of claim 1, wherein:
   the one or more wireless reference signals of each of the first measurement, the second measurement, the third measurement, and the fourth measurement comprise an uplink (UL) reference signal or sidelink (SL) reference signal transmitted by the mobile device;
   the third measurement comprises a first time of arrival (TOA) measurement;
   the fourth measurement comprises a second TOA measurement;
   the differential value comprises a time difference between the first TOA measurement and the second TOA measurement; and
   determining the position estimate of the mobile device further comprises estimating a timing error based at least in part on:
      the differential value, and
      the respective location of each of the first wireless node, the second wireless node, and the RIS.

10. The method of claim 9, wherein the method is performed by a computer server.

11. A device for reconfigurable intelligent surface (RIS)-assisted calibration for timing errors in wireless nodes used in position determination of a mobile device, the device comprising:
   a transceiver;
   a memory; and one or more processing units communicatively coupled with the transceiver and the memory, the one or more processing units configured to:
  obtain, via the transceiver, a set of wireless reference signal measurements comprising:
    a first measurement of one or more wireless reference signals traveling between the mobile device and a first wireless node;
    a second measurement of one or more wireless reference signals traveling between the mobile device and a second wireless node;
    a third measurement of one or more wireless reference signals reflected by a RIS while traveling between the mobile device and the first wireless node; and
    a fourth measurement of one or more wireless reference signals reflected by the RIS while traveling between the mobile device and the second wireless node;
  obtain a differential value comprising a difference between the third measurement and the fourth measurement; and
  determine a position estimate of the mobile device based at least in part on:
    the set of wireless reference signal measurements,
    the differential value, and
    a respective location of each of the first wireless node, the second wireless node, and the RIS.

12. The device of claim 11, wherein the device comprises a computer server in communication with the mobile device, and wherein, to determine the position estimate, the one or more processing units are configured to receive, via the transceiver, the measurements made by the mobile device.

13. The device of claim 11, wherein:
the first measurement, the second measurement, the third measurement, and the fourth measurement each comprise a respective Round-Trip Time (RTT) measurement; and
to determine the position estimate of the mobile device, the one or more processing units are configured to determine a difference between the differential value and a second differential value, the second differential value comprising a difference between the third measurement and the fourth measurement.

14. The device of claim 13, wherein the device comprises the mobile device or a computer server.

15. The device of claim 11, wherein:
the one or more wireless reference signals of each of the first measurement, the second measurement, the third measurement, and the fourth measurement comprise a downlink (DL) reference signal or a sidelink (SL) reference signal received by the mobile device;
the differential value comprises a Reference Signal Time Difference (RSTD) measurement based on the third measurement and the fourth measurement; and
to determine the position estimate of the mobile device, the one or more processing units are configured to estimate a timing error based at least in part on:
  the RSTD measurement based on the third measurement and the fourth measurement, and
  the respective location of each of the first wireless node, the second wireless node, and the RIS.

16. The device of claim 15, wherein the device comprises the mobile device, and wherein the one or more processing units are further configured to determine the RSTD measurement and send, via the transceiver, the RSTD measurement to a computer server.

17. The device of claim 15, wherein the one or more processing units are further configured to determine the timing error and send, via the transceiver, the timing error to a computer server.

18. The device of claim 15, wherein the one or more processing units are further configured to determine the position estimate.

19. The device of claim 11, wherein:
the one or more wireless reference signals of each of the first measurement, the second measurement, the third measurement, and the fourth measurement comprise an uplink (UL) reference signal or sidelink (SL) reference signal transmitted by the mobile device;
the third measurement comprises a first time of arrival (TOA) measurement;
the fourth measurement comprises a second TOA measurement;
the differential value comprises a time difference between the first TOA measurement and the second TOA measurement; and
to determine the position estimate of the mobile device, the one or more processing units are configured to estimate a timing error based at least in part on:
  the differential value, and
  the respective location of each of the first wireless node, the second wireless node, and the RIS.

20. The device of claim 19, wherein the device comprises a computer server.

21. A device for reconfigurable intelligent surface (RIS)-assisted calibration for timing errors in wireless nodes used in position determination of a mobile device, the device comprising:
  means for obtaining a set of wireless reference signal measurements comprising:
    a first measurement of one or more wireless reference signals traveling between the mobile device and a first wireless node;
    a second measurement of one or more wireless reference signals traveling between the mobile device and a second wireless node;
    a third measurement of one or more wireless reference signals reflected by a RIS while traveling between the mobile device and the first wireless node; and
    a fourth measurement of one or more wireless reference signals reflected by the RIS while traveling between the mobile device and the second wireless node;
  means for obtaining a differential value comprising a difference between the third measurement and the fourth measurement; and
  means for determining a position estimate of the mobile device based at least in part on:
    the set of wireless reference signal measurements,
    the differential value, and
    a respective location of each of the first wireless node, the second wireless node, and the RIS.

22. The device of claim 21, wherein the means for determining the position estimate comprises means for receiving, at the device, the measurements made by the mobile device.

23. The device of claim 21, wherein:
the first measurement, the second measurement, the third measurement, and the fourth measurement each comprise a respective Round-Trip Time (RTT) measurement; and
the means for determining the position estimate of the mobile device further comprises means for determining a difference between the differential value and a second differential value, the second differential value comprising a difference between the third measurement and the fourth measurement.

24. The device of claim 23, wherein the device comprises the mobile device or a computer server.

25. The device of claim 21, wherein:
the one or more wireless reference signals of each of the first measurement, the second measurement, the third measurement, and the fourth measurement comprise a downlink (DL) reference signal or a sidelink (SL) reference signal received by the mobile device;
the differential value comprises a Reference Signal Time Difference (RSTD) measurement based on the third measurement and the fourth measurement; and
the means for determining the position estimate of the mobile device further comprises means for estimating a timing error based at least in part on:
the RSTD measurement based on the third measurement and the fourth measurement, and
the respective location of each of the first wireless node, the second wireless node, and the RIS.

26. The device of claim 25, wherein the device comprises the mobile device, and wherein the device further comprises means for determining the RSTD measurement and means for sending the RSTD measurement to a computer server.

27. The device of claim 25, wherein the device comprises the mobile device, and wherein the device further comprises means for determining the timing error and means for sending the timing error to a computer server.

28. The device of claim 25, wherein the device comprises the mobile device, and wherein the device further comprises means for determining the position estimate.

29. The device of claim 21, wherein:
the one or more wireless reference signals of each of the first measurement, the second measurement, the third measurement, and the fourth measurement comprise an uplink (UL) reference signal or sidelink (SL) reference signal transmitted by the mobile device;
the third measurement comprises a first time of arrival (TOA) measurement;
the fourth measurement comprises a second TOA measurement;
the differential value comprises a time difference between the first TOA measurement and the second TOA measurement; and
the means for determining the position estimate of the mobile device further comprises estimating a timing error based at least in part on:
the differential value, and
the respective location of each of the first wireless node, the second wireless node, and the RIS.

30. A non-transitory computer-readable medium storing instructions for reconfigurable intelligent surface (RIS)-assisted calibration for timing errors in wireless nodes used in position determination of a mobile device, the instructions comprising code for:
obtaining a set of wireless reference signal measurements comprising:
a first measurement of one or more wireless reference signals traveling between the mobile device and a first wireless node;
a second measurement of one or more wireless reference signals traveling between the mobile device and a second wireless node;
a third measurement of one or more wireless reference signals reflected by a RIS while traveling between the mobile device and the first wireless node; and
a fourth measurement of one or more wireless reference signals reflected by the RIS while traveling between the mobile device and the second wireless node;
obtaining a differential value comprising a difference between the third measurement and the fourth measurement; and
determining a position estimate of the mobile device based at least in part on:
the set of wireless reference signal measurements,
the differential value, and
a respective location of each of the first wireless node, the second wireless node, and the RIS.

* * * * *